(12) United States Patent
Chen et al.

(10) Patent No.: US 12,451,801 B2
(45) Date of Patent: Oct. 21, 2025

(54) DC/DC CONVERTER, VOLTAGE GAIN SWITCHING METHOD AND SYSTEM

(71) Applicant: Huawei Digital Power Technologies Co., Ltd., Shenzhen (CN)

(72) Inventors: Haitao Chen, Shenzhen (CN); Xingzhong Zhang, Dongguan (CN); Zhengdong Jiang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 237 days.

(21) Appl. No.: 18/174,084

(22) Filed: Feb. 24, 2023

(65) Prior Publication Data

US 2023/0208287 A1    Jun. 29, 2023

Related U.S. Application Data

(63) Continuation of application No. PCT/CN2020/112908, filed on Sep. 1, 2020.

(51) Int. Cl.
*H02M 3/07*   (2006.01)
*H02M 1/00*   (2006.01)
*H02M 3/00*   (2006.01)
*H02M 3/158*  (2006.01)

(52) U.S. Cl.
CPC .......... *H02M 3/07* (2013.01); *H02M 1/0095* (2021.05); *H02M 3/01* (2021.05); *H02M 3/015* (2021.05); *H02M 3/158* (2013.01)

(58) Field of Classification Search
CPC ...... H02M 1/0095; H02M 3/01; H02M 3/015; H02M 3/07; H02M 3/158
See application file for complete search history.

(56) References Cited

U.S. PATENT DOCUMENTS

| | | | |
|---|---|---|---|
| 11,165,335 | B2 * | 11/2021 | Sblano ................ H02M 3/1584 |
| 2015/0222187 | A1 | 8/2015 | Marsili et al. |
| 2020/0153347 | A1 * | 5/2020 | Li ............................ H02M 3/01 |

(Continued)

FOREIGN PATENT DOCUMENTS

| | | |
|---|---|---|
| CN | 101286694 A | 10/2008 |
| CN | 107431435 A | 12/2017 |
| WO | 2019145015 A1 | 8/2019 |

OTHER PUBLICATIONS

Webb et al., "12 Switch Zero-Inductor Voltage Converter Topology", IEEE, 2019, 978-5386-8330-9, 8 pages.

(Continued)

*Primary Examiner* — Gary L Laxton
(74) *Attorney, Agent, or Firm* — Maier & Maier, PLLC

(57) ABSTRACT

A DC/DC converter and a voltage gain switching method and system. A first resonance unit of the DC/DC converter includes a first terminal and a second terminal connected to a second capacitor unit, and a third terminal and a fourth terminal connected to a first capacitor unit. A second resonance unit of the DC/DC converter includes a first terminal connected to a second terminal of the second capacitor unit, and a second terminal of the second resonance unit connected to a first input/output terminal of the DC/DC converter, a third terminal connected to the ground terminal of the DC/DC converter, and a fourth terminal connected to a first voltage gain changeover switch. The DC/DC converter can improve voltage gain switching efficiency.

19 Claims, 8 Drawing Sheets

(56) References Cited

U.S. PATENT DOCUMENTS

2020/0186039 A1* 6/2020 Cheng .............. H02M 3/1588
2020/0313550 A1* 10/2020 Chen ..................... H02M 3/07
2021/0184586 A1* 6/2021 Jin ....................... H02M 3/158

OTHER PUBLICATIONS

Li et al., "A High Efficiency Resonant Switched-Capacitor Converter for Data Center", IEEE, 2017, 978-1-5090-2998-3, 7 pages.
Ahmed et al., "High-Efficiency High-Power-Density 48/1V Sigma Converter Voltage Regulator Module", Center for Power Electronics Systems (CPES), IEEE, 2017, 978-1-5090-5366-7, 6 pages.
Ni et al., "A Comparison of 100 KW SiC DC-DC Converters for Electric Vehicles", 2019 IEEE Transportation Electrification Conference and Expo (ITEC), IEEE, XP033592680, Jun. 19, 2019, pp. 1-6.
Mizanur et al., "A Modularized Battery Charge Equalizer in the Application of Electric Vehicle", 2014 IEEE International Conference on Smart Instrumentation, Measurement and Applications (ICSIMA), IEEE, XP032738815, Nov. 25, 2014, pp. 1-5.

* cited by examiner

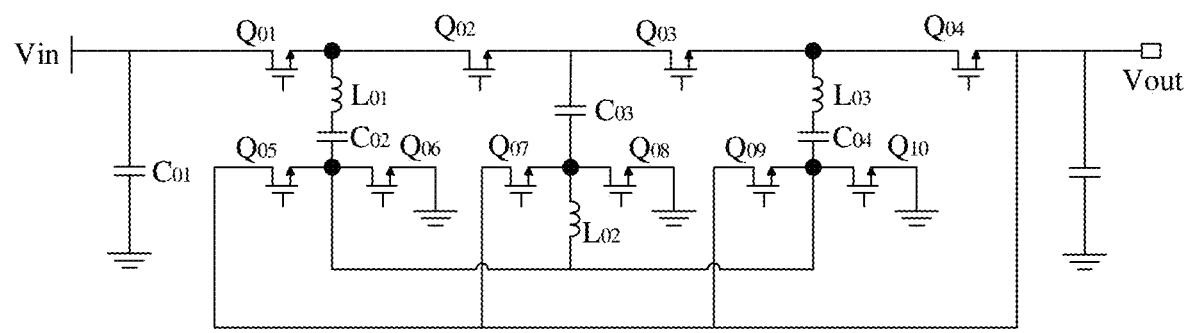
FIG. 1 -Prior Art-
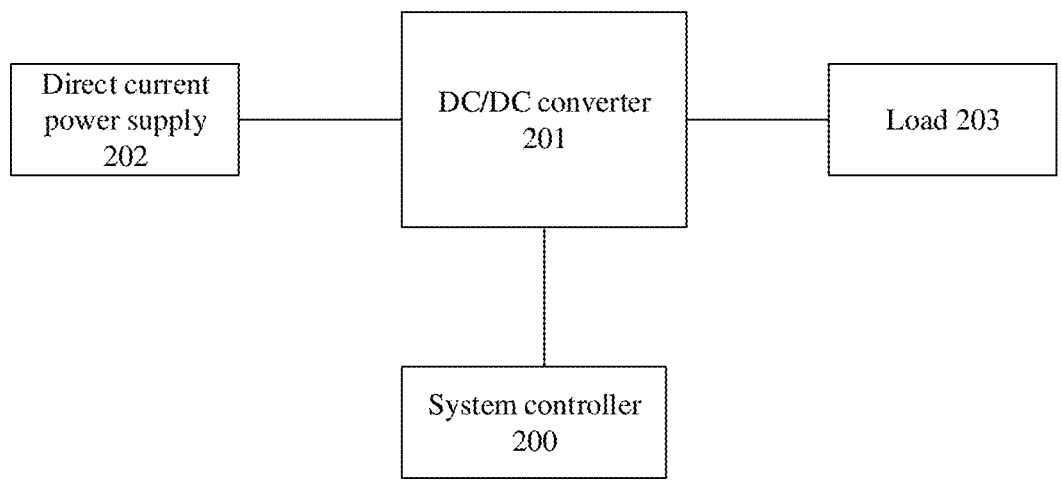
FIG. 2

DC/DC CONVERTER, VOLTAGE GAIN SWITCHING METHOD AND SYSTEM

CROSS-REFERENCE TO RELATED APPLICATIONS

This application is a continuation of International Application No. PCT/CN2020/112908, filed on Sep. 1, 2020, the disclosure of which is hereby incorporated by reference in its entirety.

TECHNICAL FIELD

The embodiments relates to the field of power supply technologies, a DC/DC converter, and a voltage gain switching method and system.

BACKGROUND

A Direct-Current/Direct-Current (DC/DC) converter) is a voltage converter that converts an input direct current voltage into a specified direct current voltage and outputs the specified direct current voltage, and used to resolve a problem that a supply voltage of a power supply does not match a voltage required by a power consumption system. For example, an artificial intelligence chip may need to be powered at a low voltage (for example, a 0.7 V voltage), but an existing communications system uses a unified power supply standard of 48 V. Therefore, the existing 48 V voltage needs to be converted into a low voltage to drive the artificial intelligence chip to work.

The existing technology uses a voltage converter shown in FIG. 1. By separately turning switching transistors $Q_{01}$ to $Q_{10}$ on or off, capacitors $C_{01}$, $C_{02}$, $C_{03}$, and $C_{04}$, and inductors $L_{01}$, $L_{02}$, and $L_{03}$ may be charged and discharged, so that an input voltage may be transmitted to an output terminal stage by stage. This may reduce the input voltage. A voltage gain that may be implemented by the voltage converter shown in FIG. 1 is ¼, that is, when the input voltage is 48 V, a fixed 12 V output voltage may be implemented by using the voltage converter. However, in the existing technology, one voltage converter can output only one fixed voltage value. If the output voltage needs to be changed, the voltage gain can be changed only by replacing the voltage converter. A method for changing the voltage gain in the existing technology is inefficient.

SUMMARY

In view of the foregoing problem, the embodiments may provide a DC/DC converter and a voltage gain switching method, to implement different voltage gains in one DC/DC converter, to output different voltage values. This can improve voltage gain switching efficiency.

A first aspect may provide a DC/DC converter. The DC/DC converter has a first input/output terminal, a second input/output terminal, and a ground terminal. The DC/DC converter includes a first capacitor unit, a second capacitor unit, a first resonance unit, and a second resonance unit.

A first terminal of the first capacitor unit is connected to a ground terminal of the DC/DC converter, and a second terminal of the first capacitor unit is connected to a second input/output terminal of the DC/DC converter and a first terminal of the second capacitor unit.

A first terminal and a second terminal of the first resonance unit are respectively connected to two terminals of the second capacitor unit, to form a first resonance circuit of the first resonance unit. A third terminal and a fourth terminal of the first resonance unit are respectively connected to two terminals of the first capacitor unit, to form a second resonance circuit of the first resonance unit.

A first terminal of the second resonance unit is connected to a second terminal of the second capacitor unit, a second terminal of the second resonance unit is connected to a first input/output terminal of the DC/DC converter, to form a first resonance circuit of the second resonance unit. A third terminal of the second resonance unit is connected to the ground terminal of the DC/DC converter, and a fourth terminal of the second resonance unit is connected to a first voltage gain changeover switch, to form a second resonance circuit of the second resonance unit. The first voltage gain changeover switch is configured to connect the fourth terminal of the second resonance unit to the second terminal of the first capacitor unit, or connect the fourth terminal of the second resonance unit to the second terminal of the second capacitor unit.

The fourth terminal of the second resonance unit may be connected to second terminals of different capacitor units by using the first voltage gain changeover switch, so that the DC/DC converter has different voltage gains in a same circuit structure, to output different voltage values.

With reference to the first aspect, in a first possible implementation, the first voltage gain changeover switch is configured to connect, based on a received voltage gain switching signal, the fourth terminal of the second resonance unit to the second terminal of the first capacitor unit or the second terminal of the second capacitor unit.

With reference to the first aspect, in a second possible implementation, the first voltage gain changeover switch includes a first voltage gain changeover sub-switch and a second voltage gain changeover sub-switch, one terminal of the first voltage gain changeover sub-switch and one terminal of the second voltage gain changeover sub-switch are connected to the fourth terminal of the second resonance unit, the other terminal of the first voltage gain changeover sub-switch is connected to the second terminal of the first capacitor unit, and the other terminal of the second voltage gain changeover sub-switch is connected to the second terminal of the second capacitor unit.

With reference to the second possible implementation of the first aspect, in a third possible implementation, the first input/output terminal of the DC/DC converter is an input terminal, and the second input/output terminal of the DC/DC converter is an output terminal.

When the first voltage gain changeover sub-switch is connected to the fourth terminal of the second resonance unit and the second terminal of the first capacitor unit, a voltage gain of the DC/DC converter is ⅓.

When the second voltage gain changeover sub-switch is connected to the fourth terminal of the second resonance unit and the second terminal of the second capacitor unit, the voltage gain of the DC/DC converter is ¼.

With reference to the second possible implementation of the first aspect, in a fourth possible implementation, the first input/output terminal of the DC/DC converter is an output terminal, and the second input/output terminal of the DC/DC converter is an input terminal.

When the first voltage gain changeover sub-switch is connected to the fourth terminal of the second resonance unit and the second terminal of the first capacitor unit, the voltage gain of the DC/DC converter is 3.

When the second voltage gain changeover sub-switch is connected to the fourth terminal of the second resonance unit and the second terminal of the second capacitor unit, the voltage gain of the DC/DC converter is 4.

With reference to the first aspect or with reference to any one of the foregoing possible implementations of the first aspect, in a fifth possible implementation, a third capacitor unit is disposed between the first input/output terminal of the DC/DC converter and the second terminal of the second capacitor unit, and the third capacitor unit and the second resonance unit form the first resonance circuit of the second resonance unit.

With reference to the first aspect, in a sixth possible implementation, the DC/DC converter includes M capacitor units and M resonance units. The M capacitor units include the first capacitor unit and the second capacitor unit. The M resonance units include the first resonance unit and the second resonance unit. M is an integer not less than 3.

A first terminal of an $(N+1)^{th}$ capacitor unit in the M capacitor units is connected to a second terminal of an $N^{th}$ capacitor unit.

A first terminal and a second terminal of an $N^{th}$ resonance unit in the M resonance units are respectively connected to two terminals of the $(N+1)^{th}$ capacitor unit, to form a first resonance circuit of the $N^{th}$ resonance unit. A third terminal of the $N^{th}$ resonance unit is connected to the ground terminal of the DC/DC converter, and a fourth terminal of the $N^{th}$ resonance unit is connected to an $(N-1)^{th}$ voltage gain changeover switch, to form a second resonance circuit of the $N^{th}$ resonance unit. The $(N-1)^{th}$ voltage gain changeover switch is configured to connect the fourth terminal of the $N^{th}$ resonance unit to a second terminal of any capacitor unit from the first capacitor unit to the $N^{th}$ capacitor unit, and N is an integer not less than 2 and not greater than M−1.

A first terminal of an $M^{th}$ capacitor unit in the M capacitor units is connected to a second terminal of an $(M-1)^{th}$ capacitor unit.

A first terminal of an $M^{th}$ resonance unit in the M resonance units is connected to a second terminal of the $M^{th}$ capacitor unit, and a second terminal of the $M^{th}$ resonance unit is connected to the first input/output terminal of the DC/DC converter, to form a first resonance circuit of the $M^{th}$ resonance unit. A third terminal of the $M^{th}$ resonance unit is connected to the ground terminal of the DC/DC converter, a fourth terminal of the $M^{th}$ resonance unit is connected to an $(M-1)^{th}$ voltage gain changeover switch, and the $(M-1)^{th}$ voltage gain changeover switch is configured to connect the fourth terminal of the $M^{th}$ resonance unit to a second terminal of any capacitor unit from the first capacitor unit to the $M^{th}$ capacitor unit. In this possible implementation, a fourth terminal of a resonance unit is separately connected to the second terminals of the different capacitor units by adding a capacitor unit, a resonance unit, and a voltage gain changeover switch, so that a plurality of voltage gains may be implemented, to increase a quantity of output voltage values of the DC/DC converter.

With reference to the sixth possible implementation of the first aspect, in a seventh possible implementation, the $(N-1)^{th}$ voltage gain changeover switch is configured to connect, based on a received voltage gain switching signal, the fourth terminal of the $N^{th}$ resonance unit to the second terminal of any capacitor unit from the first capacitor unit to the $N^{th}$ capacitor unit.

The $(M-1)^{th}$ voltage gain changeover switch is configured to connect, based on the received voltage gain switching signal, the fourth terminal of the $M^{th}$ resonance unit to the second terminal of any capacitor unit from the first capacitor unit to the $M^{th}$ capacitor unit.

With reference to the sixth possible implementation of the first aspect, in an eighth possible implementation, the $(N-1)^{th}$ voltage gain changeover switch includes N voltage gain changeover sub-switches that respectively correspond to the first capacitor unit to the $N^{th}$ capacitor unit. One terminal of each voltage gain changeover sub-switch of the N voltage gain changeover sub-switches is connected to the fourth terminal of the $N^{th}$ resonance unit, and the other terminal of each voltage gain changeover sub-switch is connected to a second terminal of the corresponding capacitor unit.

The $(M-1)^{th}$ voltage gain changeover switch includes M voltage gain changeover sub-switches that respectively correspond to the M capacitor units. One terminal of each voltage gain changeover sub-switch of the M voltage gain changeover sub-switches is connected to the fourth terminal of the $M^{th}$ resonance unit, and the other terminal of each voltage gain changeover sub-switch is connected to the second terminal of the corresponding capacitor unit.

With reference to the sixth possible implementation of the first aspect, with reference to the seventh possible implementation of the first aspect, or with reference to the eighth possible implementation of the first aspect, in a ninth possible implementation, an $(M+1)^{th}$ capacitor unit is disposed between the first input/output terminal of the DC/DC converter and the second terminal of the $M^{th}$ capacitor unit, and the $(M+1)^{th}$ capacitor unit and the $M^{th}$ resonance unit form the first resonance circuit of the $M^{th}$ resonance unit.

With reference to the sixth possible implementation of the first aspect to the ninth possible implementation of the first aspect, in a tenth possible implementation, if the first input/output terminal of the DC/DC converter is an input terminal and the second input/output terminal of the DC/DC converter is an output terminal, a voltage gain of the DC/DC converter is between 1/2 N and 1/(N+1). If the first input/output terminal of the DC/DC converter is an output terminal and the second input/output terminal of the DC/DC converter is an input terminal, the voltage gain of the DC/DC converter is between N+1 to 2 N.

With reference to the first aspect or with reference to any one of the foregoing possible implementations of the first aspect, in an eleventh possible implementation, if the first input/output terminal of the DC/DC converter is an input terminal and the second input/output terminal is an output terminal, the first input/output terminal of the DC/DC converter is connected to a direct current power supply, and the second input/output terminal is connected to a load. If the first input/output terminal of the DC/DC converter is an output terminal and the second input/output terminal is an input terminal, the first input/output terminal of the DC/DC converter is connected to the load, and the second input/output terminal is connected to the direct current power supply. In this possible implementation, the input terminal and the output terminal of the DC/DC converter may be exchanged without changing a connection relationship inside the DC/DC converter. This can improve efficiency and flexibility of voltage gain switching of the DC/DC converter.

With reference to the first aspect or with reference to any one of the foregoing possible implementations of the first aspect, in a twelfth possible implementation, a conduction time of the first resonance circuit of the resonance unit of the DC/DC converter is equal to a conduction time of the second resonance circuit.

A second aspect may provide a voltage gain switching method of a DC/DC converter. The method is applied to the DC/DC converter with reference to the first aspect or the first possible implementation to the fifth possible implementation of the first aspect. The method includes: controlling the first voltage gain changeover switch to connect the fourth terminal of the second resonance unit to the second terminal of the first capacitor unit or connect the fourth terminal of the second resonance unit to the second terminal of the second capacitor unit.

With reference to the second aspect, in a first possible implementation, the controlling the first voltage gain changeover switch to connect the fourth terminal of the second resonance unit to the second terminal of the first capacitor unit, or connect the fourth terminal of the second resonance unit to the second terminal of the second capacitor unit may be implemented: sending a voltage gain switching signal to the first voltage gain changeover switch, so that the first voltage gain changeover switch connects, based on the voltage gain switching signal, the fourth terminal of the second resonance unit to the second terminal of the first capacitor unit or the second terminal of the second capacitor unit.

With reference to the second aspect, in a second possible implementation, the first voltage gain changeover switch includes a first voltage gain changeover sub-switch and a second voltage gain changeover sub-switch.

The controlling the first voltage gain changeover switch to connect the fourth terminal of the second resonance unit to the second terminal of the first capacitor unit, or connect the fourth terminal of the second resonance unit to the second terminal of the second capacitor unit may be implemented:
  controlling the first voltage gain changeover sub-switch to connect the fourth terminal of the second resonance unit to the second terminal of the first capacitor unit; or
  controlling the second voltage gain changeover sub-switch to connect the fourth terminal of the second resonance unit to the second terminal of the second capacitor unit.

With reference to the second possible implementation of the second aspect, in a third possible implementation, the first input/output terminal of the DC/DC converter is an input terminal, and the second input/output terminal of the DC/DC converter is an output terminal.

When the first voltage gain changeover sub-switch is connected to the fourth terminal of the second resonance unit and the second terminal of the first capacitor unit, a voltage gain of the DC/DC converter is ⅓.

When the second voltage gain changeover sub-switch is connected to the fourth terminal of the second resonance unit and the second terminal of the second capacitor unit, the voltage gain of the DC/DC converter is ¼.

With reference to the second possible implementation of the second aspect, in a fourth possible implementation, the first input/output terminal of the DC/DC converter is an output terminal, and the second input/output terminal of the DC/DC converter is an input terminal.

When the first voltage gain changeover sub-switch is connected to the fourth terminal of the second resonance unit and the second terminal of the first capacitor unit, the voltage gain of the DC/DC converter is 3.

When the second voltage gain changeover sub-switch is connected to the fourth terminal of the second resonance unit and the second terminal of the second capacitor unit, the voltage gain of the DC/DC converter is 4.

A third aspect may provide a voltage gain switching method of a DC/DC converter. The method is applied to the DC/DC converter with reference to the sixth possible implementation to the tenth possible implementation of the first aspect. The method includes:

controlling the $(N-1)^{th}$ voltage gain changeover switch to connect the fourth terminal of the $N^{th}$ resonance unit to the second terminal of any capacitor unit from the first capacitor unit to the $N^{th}$ capacitor unit; or
controlling the $(M-1)^{th}$ voltage gain changeover switch to connect the fourth terminal of the $M^{th}$ resonance unit to the second terminal of any capacitor unit from the first capacitor unit to the $M^{th}$ capacitor unit.

With reference to the third aspect, in a first possible implementation, the controlling the $(N-1)^{th}$ voltage gain changeover switch to connect the fourth terminal of the $N^{th}$ resonance unit to the second terminal of any capacitor unit from the first capacitor unit to the $N^{th}$ capacitor unit is implemented: sending a voltage gain switching signal to the $(N-1)^{th}$ voltage gain changeover switch, so that the $(N-1)^{th}$ voltage gain changeover switch connects, based on the voltage gain switching signal, the fourth terminal of the $N^{th}$ resonance unit to the second terminal of any capacitor unit from the first capacitor unit to the $N^{th}$ capacitor unit.

The controlling the $(M-1)^{th}$ voltage gain changeover switch to connect the fourth terminal of the $M^{th}$ resonance unit to the second terminal of any capacitor unit from the first capacitor unit to the $M^{th}$ capacitor unit is implemented: sending the voltage gain switching signal to the $M^{th}$ resonance unit, so that the $M^{th}$ resonance unit connects, based on the voltage gain switching signal, the fourth terminal of the $M^{th}$ resonance unit to the second terminal of any capacitor unit from the first capacitor unit to the $M^{th}$ capacitor unit.

With reference to the third aspect, in a second possible implementation, the $(N-1)^{th}$ voltage gain changeover switch includes N voltage gain changeover sub-switches that respectively correspond to the first capacitor unit to the $N^{th}$ capacitor unit. The $(M-1)^{th}$ voltage gain changeover switch includes M voltage gain changeover sub-switches that respectively correspond to the M capacitor units.

The controlling the $(N-1)^{th}$ voltage gain changeover switch to connect the fourth terminal of the $N^{th}$ resonance unit to the second terminal of any capacitor unit from the first capacitor unit to the $N^{th}$ capacitor unit is implemented: controlling any voltage gain changeover sub-switch in the $(N-1)^{th}$ voltage gain changeover switch to connect the second terminal of the corresponding capacitor unit.

The controlling the $(M-1)^{th}$ voltage gain changeover switch to connect the fourth terminal of the $M^{th}$ resonance unit to the second terminal of any capacitor unit from the first capacitor unit to the $M^{th}$ capacitor unit is implemented: controlling any voltage gain changeover sub-switch in the $(M-1)^{th}$ voltage gain changeover switch to connect the second terminal of the corresponding capacitor unit.

A fourth aspect may provide a voltage gain switching system. The system includes a system controller and the DC/DC converter provided with reference to any one of the first aspect or the possible implementations of the first aspect. The system controller is connected to the DC/DC converter and is configured to perform the second aspect, any one of the possible implementations of the second aspect, the third aspect, and/or any one of the possible implementations of the third aspect.

BRIEF DESCRIPTION OF THE DRAWINGS

FIG. 1 is a voltage converter according to a conventional technology;

FIG. 2 is an application scenario diagram of a DC/DC converter according to an embodiment;

DETAILED DESCRIPTION OF THE EMBODIMENTS

Figure 3:
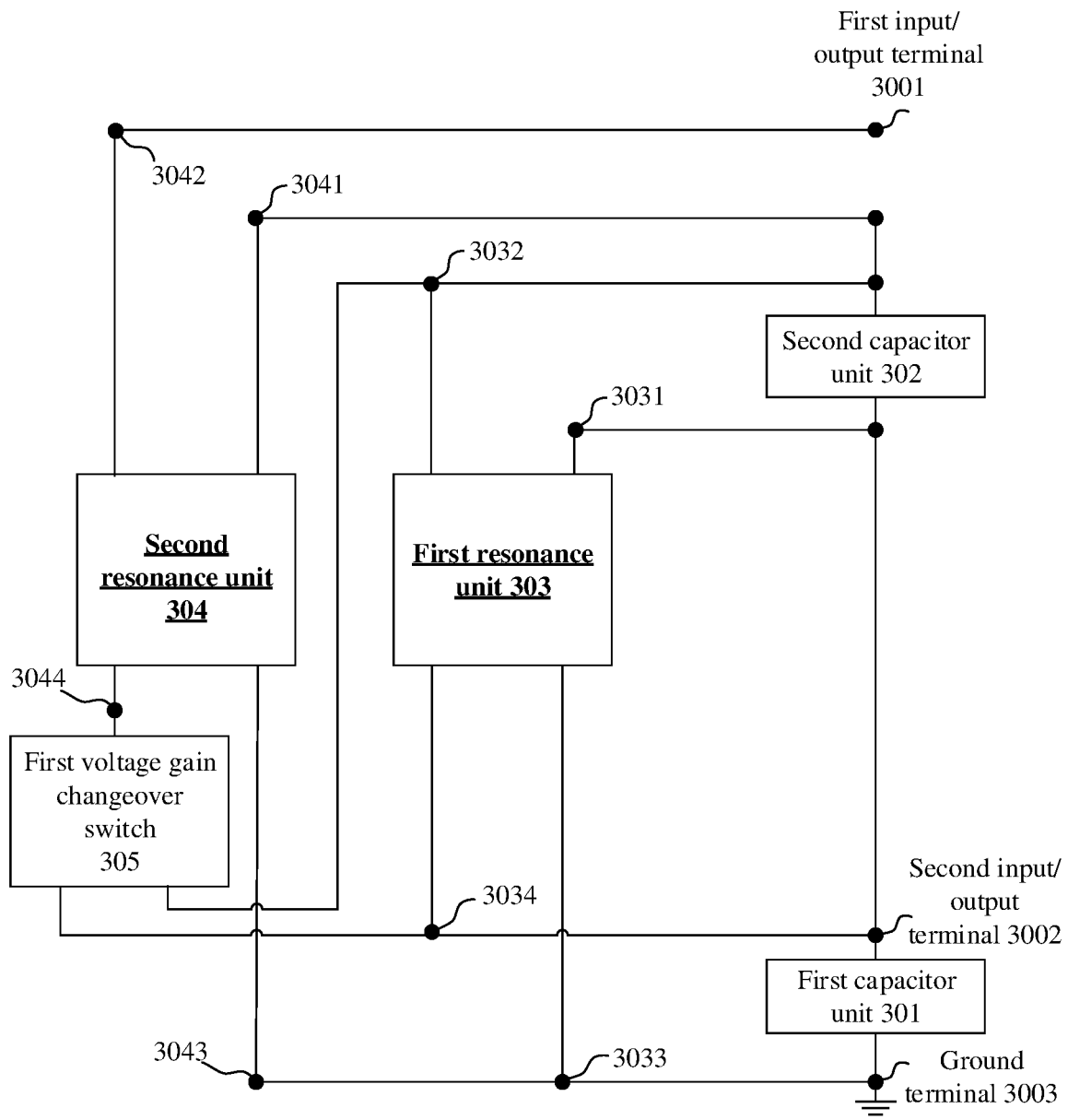
FIG. 3 is a schematic block diagram of a DC/DC converter according to an embodiment.

The following describes the embodiments with reference to the accompanying drawings in embodiments. It is clear that the described embodiments are some but not all of the embodiments. All other embodiments obtained by a person of ordinary skill in the art based on the embodiments without creative efforts shall fall within the scope of the embodiments.

The embodiments may be applied to a voltage conversion scenario. FIG. 2 is a diagram of a DC/DC converter according to an embodiment. As shown in FIG. 2, an input terminal of a DC/DC converter 201 is connected to a direct current power supply 202, and an output terminal is connected to a load 203. The direct current power supply 202 may be, for example, an energy storage battery (for example, a Ni—Cd battery, a Ni-MH battery, a lithium-ion battery, or a lithium polymer battery), a solar cell, an Alternating Current/Direct-Current (AC/DC) converter, or another DC/DC converter (for example, a BUCK converter, a BOOST converter, or a BUCK-BOOST converter). The load 203 may be, for example, an artificial intelligence chip, an image processor, a mobile phone terminal, a photovoltaic inverter, an electric vehicle, another DC/DC converter, and/or a Direct-Current/Alternating-Current (DC/AC) converter. The DC/DC converter 201 may convert a voltage of the direct current power supply 202 into a voltage required by the load 203.

In a feasible implementation, the DC/DC converter 201 is further connected to a system controller 200. The system controller 200 may control a voltage gain changeover switch in the DC/DC converter 201 to connect a fourth terminal of a second resonance unit in the DC/DC converter 201 to second terminals of different capacitor units, so that the DC/DC converter 201 has different voltage gains in a same circuit structure, to output different voltage values.

For example, the load 203 is a mobile phone terminal, and the direct current power supply 202 is an AC/DC converter that converts a power grid 220 V into a direct current voltage. The system controller 200 may identify different mobile phone terminals, and control, based on charging voltages required by the different mobile phone terminals, the DC/DC converter 201 to switch a voltage gain. If the DC/DC converter 201 is disposed in a charger of the mobile phone terminal, one charger may be applicable to a plurality of mobile phone terminals that require different charging voltages.

The DC/DC converter 201 may buck or boost. For example, if a first input/output terminal of the DC/DC converter 201 is an input terminal, and a second input/output terminal is an output terminal, the first input/output terminal of the DC/DC converter 201 is connected to the direct current power supply 202, and the second input/output terminal is connected to the load 203. In this case, the DC/DC converter 201 is a buck converter. For another example, if the first input/output terminal of the DC/DC converter 201 is an output terminal, and the second input/output terminal is an input terminal, the first input/output terminal of the DC/DC converter 201 is connected to the load 203, and the second input/output terminal is connected to the direct current power supply 202. In this case, the DC/DC converter 201 is a boost converter.

The foregoing is an example of an application scenario of the DC/DC converter, but is not exhaustive. It should be understood that the DC/DC converter may be used in any scenario in which a direct current voltage needs to be converted.

The following describes a structure of the DC/DC converter with reference to the accompanying drawings.

FIG. 3 is a schematic block diagram of a DC/DC converter according to an embodiment. As shown in FIG. 3, the DC/DC converter has a first input/output terminal 3001, a second input/output terminal 3002, and a ground terminal 3003. The first input/output terminal 3001 may be an input terminal of the DC/DC converter, and the second input/output terminal 3002 may be an output terminal of the DC/DC converter, or vice versa.

The DC/DC converter includes a first capacitor unit 301, a second capacitor unit 302, a first resonance unit 303, and a second resonance unit 304. A first terminal of the first capacitor unit 301 is connected to the ground terminal 3003 of the DC/DC converter, and a second terminal of the first capacitor unit 301 is connected to the second input/output terminal 3002 of the DC/DC converter and a first terminal of the second capacitor unit 302. A capacitor unit may be understood as including one capacitor, at least two capacitors connected in series, and/or at least two capacitors connected in parallel.

A first terminal 3031 and a second terminal 3032 of the first resonance unit 303 are respectively connected to two terminals of the second capacitor unit 302, that is, the first terminal 3031 is connected to the first terminal of the second capacitor unit 302, the second terminal 3032 is connected to a second terminal of the second capacitor unit 302. The first resonance unit 303 and the second capacitor unit 302 form a first resonance circuit of the first resonance unit 303. A third terminal 3033 and a fourth terminal 3034 of the first resonance unit 303 are respectively connected to two terminals of the first capacitor unit 301, that is, the third terminal 3033 is connected to the first terminal (that is, the ground terminal 3003) of the first capacitor unit 301, and the fourth terminal 3034 is connected to the second terminal (that is, the second input/output terminal 3002) of the first capacitor unit 301. The first resonance unit 303 and the first capacitor unit 301 form a second resonance circuit of the first resonance unit 303.

A first terminal 3041 of the second resonance unit 304 is connected to the second terminal (that is, the second terminal 3032 of the first resonance unit 303) of the second capacitor unit 302, and a second terminal 3042 of the second resonance unit 304 is connected to the first input/output terminal 3001 of the DC/DC converter. The second resonance unit 304, the first capacitor unit 302, and the second capacitor unit 303 form a first resonance circuit of the second resonance unit 304. A third terminal 3043 of the second resonance unit 304 is connected to the ground terminal 3003 of the DC/DC converter, a fourth terminal 3044 of the second resonance unit is connected to a first voltage gain changeover switch 305. The second resonance unit 304, the first voltage gain changeover switch 305, and the first capacitor unit 301 form a second resonance circuit of the second resonance unit 304, or the second resonance unit 304, the first voltage gain changeover switch 305, the second capacitor unit 302, and the first capacitor unit 301 form a second resonance circuit of the second resonance unit 304. In an implementation, the first voltage gain changeover switch 305 connects the fourth terminal 3044 of the second resonance unit 304 to the second terminal of the first capacitor unit 301 or connects the fourth terminal 3044 of the second resonance unit 304 to the second terminal of the second capacitor unit 302.

In a feasible implementation, a filter capacitor unit is connected between the first input/output terminal 3001 and the ground terminal 3003 of the DC/DC converter. The filter capacitor unit is configured to provide the second resonance unit 304 with a path for forming a closed circuit with the first input/output terminal 3001, that is, the second resonance unit 304, the second capacitor unit 303, the first capacitor unit 302, and the filter capacitor unit form the first resonance circuit of the second resonance unit 304.

In another feasible implementation, a third capacitor unit is disposed between the first input/output terminal 3001 of the DC/DC converter and the second terminal of the second capacitor unit 302. The third capacitor unit provides the second resonance unit 304 with the path for forming a closed circuit with the first input/output terminal 3001, that is, the third capacitor unit and the second resonance unit 304 form the first resonance circuit of the second resonance unit 304.

In a possible implementation, the first voltage gain changeover switch 305 may be a mechanical switch. The mechanical switch implements voltage gain switching by mechanical operations, for example, a button switch or a toggle switch.

In another possible implementation, the first voltage gain changeover switch 305 may be an electronic switch. The electronic switch implements the voltage gain switching by using a controllable electronic driving component, for example, a relay, a contactor, a metal-oxide-semiconductor field-effect transistor (MOSFET), or an insulated gate bipolar transistor (IGBT) and an anti-parallel diode thereof. When receiving a voltage gain switching signal, the first voltage gain changeover switch 305 connects the fourth terminal 3044 of the second resonance unit 304 to the second terminal of the first capacitor unit 301 or the second terminal of the second capacitor unit 302. The voltage gain switching signal may be a voltage drive signal. The voltage drive signal may enable the first voltage gain changeover switch 305 to be in an on state, to connect the second terminal of the first capacitor unit 301 or the second terminal of the second capacitor unit 302. For example, the voltage gain switching signal may be generated by a system controller that is connected to the first voltage gain changeover switch 305. The system controller may identify the type of a load that is connected to the DC/DC converter, determine an output voltage of the DC/DC converter, and generate the voltage gain switching signal.

In a feasible implementation, the first voltage gain changeover switch 305 may include a mechanical switch and/or an electronic switch.

In this embodiment, the fourth terminal of the second resonance unit 304 is connected to second terminals of the different capacitor units by using the first voltage gain changeover switch 305, so that the DC/DC converter has different voltage gains in a same circuit structure, to output different voltage values. The following provides detailed description with reference to a circuit schematic diagram.

Figure 4A:
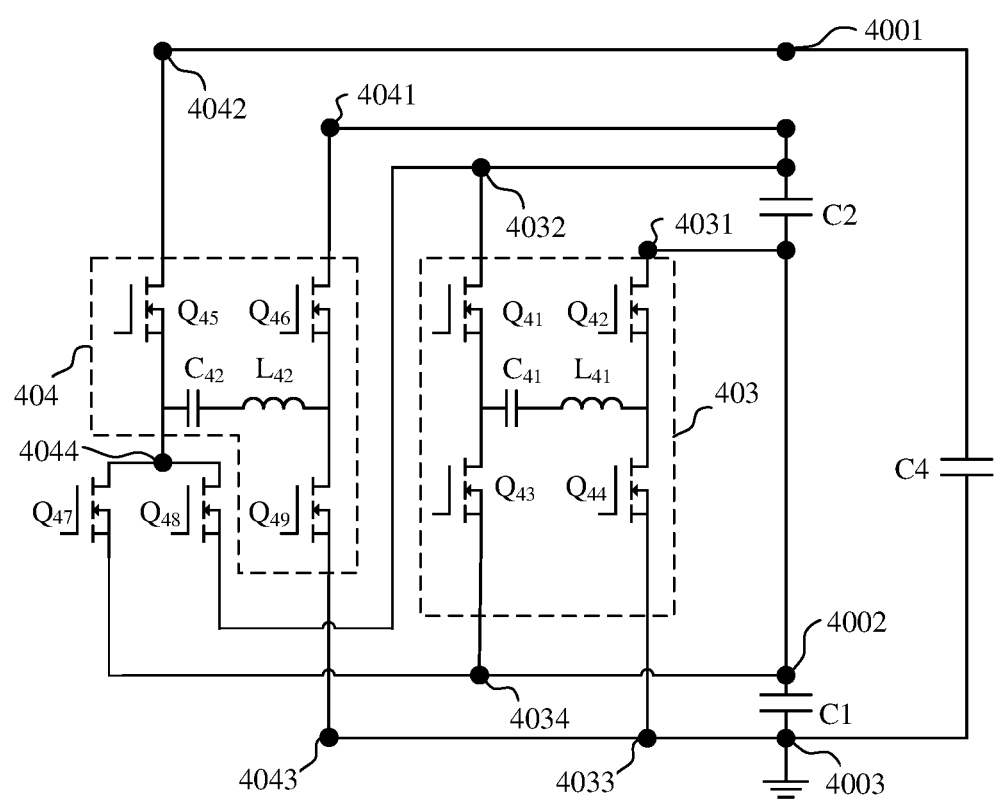
FIG. 4A is a diagram of a circuit of a DC/DC converter according to an embodiment.
Figure 4B:
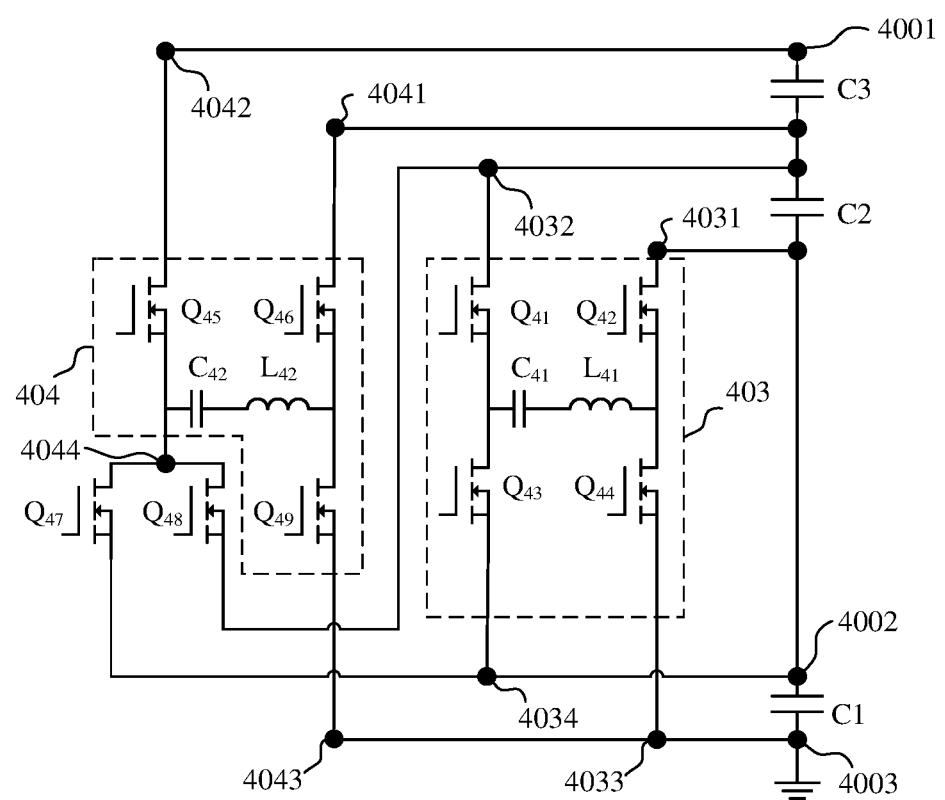
FIG. 4B is a diagram of a circuit of a DC/DC converter according to an embodiment.

The following describes an example of a connection relationship of a DC/DC converter with reference to FIG. 4A to FIG. 4B. FIG. 4A is a diagram of a circuit of a DC/DC converter according to an embodiment. As shown in FIG. 4A, the DC/DC converter has a first input/output terminal 4001, a second input/output terminal 4002, and a ground terminal 4003. The DC/DC converter includes a first capacitor unit, a second capacitor unit, a first resonance unit 403, and a second resonance unit 404. FIG. 4A uses an example in which the first capacitor unit is C1 and the second capacitor is C2.

Two terminals of C1 are connected between the second input/output terminal 4002 and the ground terminal 4003, a first terminal of C2 is connected to a second terminal of C1 (that is, the second input/output terminal 4002), and a second terminal of C2 is connected to a second terminal 4032 of the first resonance unit 403.

Switching transistors are disposed in the first resonance unit 403 and the second resonance unit 404. The switching transistor may be a contactor, a relay, a MOSFET, or an IGBT and an anti-parallel diode thereof. FIG. 4A uses an example in which the switching transistor is a MOSFET.

The switching transistors in the first resonance unit 403 include $Q_{41}$, $Q_{42}$, $Q_{43}$, and $Q_{44}$. A resonance cavity is further disposed in the first resonance unit 403. The resonance cavity includes, but is not limited to, a capacitor $C_{41}$ and an inductor $L_{41}$. A connection relationship of the first resonance unit 403 is: $Q_{41}$ and $Q_{43}$ are connected, and $Q_{42}$ and $Q_{44}$ are connected. A source of $Q_{41}$ is connected to a drain of $Q_{43}$, and a source of $Q_{42}$ is connected to a drain of $Q_{44}$. $C_{41}$ and $L_{41}$ are connected in series between a first junction and a second junction. The first junction is a junction at which the source of $Q_{41}$ is connected to the drain of $Q_{43}$, and the second junction is a junction at which the source of $Q_{42}$ is connected to the drain of $Q_{44}$. A drain of $Q_{42}$ is used as a first terminal 4031 of the first resonance unit 403, a drain of $Q_{41}$ is used as the second terminal 4032 of the first resonance unit 403, a source of $Q_{44}$ is used as a third terminal 4033 of the first resonance unit 403, and a source of $Q_{43}$ is used as a fourth terminal 4034 of the first resonance unit 403.

The switching transistors in the second resonance unit 404 include $Q_{45}$, $Q_{46}$, and $Q_{49}$. A resonance cavity is further disposed in the second resonance unit 404. The resonance cavity includes, but is not limited to, a capacitor $C_{42}$ and an inductor $L_{42}$. A connection relationship of the second resonance unit 404 is: A drain of $Q_{45}$ is used as a second terminal 4042 of the second resonance unit 404, and a source of $Q_{45}$ is used as a fourth terminal 4044 of the second resonance unit 404. $Q_{46}$ and $Q_{49}$ are connected. A source of $Q_{46}$ is connected to a drain of $Q_{49}$, a drain of $Q_{46}$ is used as a first terminal 4041 of the second resonance unit 404, and a source of $Q_{49}$ is used as a third terminal 4043 of the second resonance unit 404. $C_{42}$ and $L_{42}$ are connected in series between the fourth terminal 4044 of the second resonance unit 404 and a third junction. The third junction is a junction at which the source of $Q_{46}$ is connected to the drain of $Q_{49}$.

The fourth terminal 4044 of the second resonance unit 404 is connected to a first voltage gain changeover switch. In a feasible implementation, the first voltage gain changeover switch may include a first voltage gain changeover sub-switch and a second voltage gain changeover sub-switch. FIG. 4A uses an example in which the first voltage gain changeover switch is a MOSFET. The first voltage gain changeover sub-switch is $Q_{47}$, and the second voltage gain changeover sub-switch is $Q_{48}$. One terminal of the first voltage gain changeover sub-switch and one terminal of the second voltage gain changeover sub-switch are connected to the fourth terminal 4044 of the second resonance unit 404, that is, a drain of $Q_{47}$ and a drain of $Q_{48}$ are connected to the fourth terminal 4044 of the second resonance unit 404. The other terminal of the first voltage gain changeover sub-switch is connected to a second terminal of the first capacitor unit (that is, C1), that is, a source of $Q_{47}$ is connected to the second terminal (that is, the second input/output terminal 4002) of C1. The other terminal of the second voltage gain changeover sub-switch is connected to a second terminal of the second capacitor unit (that is, C2), that is, a source of $Q_{48}$ is connected to the second terminal of C2. FIG. 4A uses as an example in which the first voltage gain changeover sub-switch is $Q_{47}$. The second voltage gain changeover sub-switch is an example of $Q_{48}$, but is not exhaustive. It should be understood that the first voltage gain changeover switch may be of another structure, for example, a single-pole double-throw switch, a relay, or an IGBT and an anti-parallel diode thereof. A structure of a voltage gain changeover switch is not limited.

The following describes how the DC/DC converter shown in FIG. 4A implements different voltage gain switching.

In a feasible implementation, the first input/output terminal 4001 of the DC/DC converter is an input terminal, an input voltage is represented by $V_{in}$, the second input/output terminal 4002 is an output terminal, and an output voltage is represented by $V_{out}$. In this case, the first voltage gain changeover switch connects the fourth terminal 4044 of the second resonance unit 404 to the second terminal of the first capacitor unit (that is, C1), or connects the fourth terminal 4044 of the second resonance unit 404 to the second terminal of the second capacitor unit (that is, C2).

$Q_{41}$ and $Q_{42}$ in a first resonance circuit of the first resonance unit 403 are complementarily connected to $Q_{43}$ and $Q_{44}$ in a second resonance circuit, that is, when $Q_{41}$ and $Q_{42}$ are turned on, $Q_{43}$ and $Q_{44}$ are turned off, or vice versa. When $Q_{41}$ and $Q_{42}$ are turned on, $Q_{43}$ and $Q_{44}$ are turned off, and a voltage at two terminals of C2 passes $Q_{41}$, $C_{41}$, $L_{41}$, and $Q_{42}$, to form the first resonance circuit of the first resonance unit 403. In this case, $C_{41}$ and $L_{41}$ are in a charging mode. When $Q_{41}$ and $Q_{42}$ are turned off, $Q_{43}$ and $Q_{44}$ are turned on, $C_{41}$ and $L_{41}$ are in a discharging mode, and a voltage at two terminals of $C_{41}$ and $L_{41}$ passes $Q_{43}$, C1, and $Q_{44}$, to form the second resonance circuit of the first resonance unit 403. If a conduction time of the first resonance circuit of the first resonance unit 403 is equal to a conduction time of the second resonance circuit, that is, charging time and discharging time of $C_{41}$ and $L_{41}$ are the same, a voltage $V_{C2}$ at the two terminals of C2 is equal to a voltage $V_{C1}$ at two terminals of C1, and represented as:

$$V_{C2}=V_{C1} \qquad \text{Formula 1}$$

For example, duty cycles of pulse drive signals of $Q_{41}$, $Q_{42}$, $Q_{43}$, and $Q_{44}$ may be a preset quantity threshold floating around 50%. Further, a frequency of the pulse drive signal may be a resonance frequency of the resonance cavity, that is, a resonance frequency of $C_{41}$ and $L_{41}$.

A first resonance circuit of the second resonance unit 404 is formed when $Q_{45}$ and $Q_{46}$ are turned on and $Q_{47}$, $Q_{48}$, and $Q_{49}$ are turned off, that is, a voltage between the first input/output terminal 4001 of the DC/DC converter and the second terminal of C2 passes $Q_{45}$, $C_{42}$, $L_{42}$, $Q_{46}$, C2, C1, and C4, to form the first resonance circuit of the second resonance unit 404. C4 is a filter capacitor unit that is connected between the first input/output terminal 4001 of the DC/DC converter and the ground terminal 4003, and $C_{42}$ and $L_{42}$ are in the charging mode.

For example, a system controller that connected to the first voltage gain changeover switch may control the first voltage gain changeover switch to connect the fourth terminal 4044 of the second resonance unit 404 to the second terminal of the first capacitor unit (that is, C1) or the second terminal of the second capacitor unit (that is, C2). A device for controlling the voltage gain changeover switch is not limited. A voltage gain switching signal may be sent to the first voltage gain changeover switch. The voltage gain switching signal may be a pulse drive signal, and may drive the first voltage gain changeover switch to connect, based on the voltage gain switching signal, the fourth terminal 4044 of the second resonance unit 404 to the second terminal of the first capacitor unit (that is, C1) or the second terminal of the second capacitor unit (that is, C2).

In a possible implementation, the first voltage gain changeover switch is controlled to connect the fourth terminal 4044 of the second resonance unit 404 to the second terminal of the first capacitor unit (that is, C1). In an implementation, a first voltage gain changeover sub-switch $Q_{47}$ is controlled to connect the fourth terminal 4044 of the second resonance unit 404 to the second terminal of the first capacitor unit (that is, C1). In this case, $Q_{47}$ and $Q_{49}$ are controlled to be turned on, and $Q_{45}$ and $Q_{46}$ are controlled to be turned off. In this case, $C_{42}$ and $L_{42}$ are in the discharging mode, and a voltage at two terminals of $C_{42}$ and $L_{42}$ passes $Q_{47}$, C1, and $Q_{49}$, to form the second resonance circuit of the second resonance unit 404. If a conduction time of the first resonance circuit of the second resonance unit 404 is equal to a conduction time of the second resonance circuit, that is, charging time and discharging time of $C_{42}$ and $L_{42}$ are the same, a voltage between the first input/output terminal 4001 and the second terminal of C2 is equal to a voltage at the two terminals of C1, and represented as:

$$V_{in}-V_{C2}-V_{C1}=V_{C1} \qquad \text{Formula 2}$$

Optionally, resonance units of the DC/DC converter may be synchronously turned on, synchronously turned off, alternately turned on, or alternately turned off. Duty cycles of pulse drive signals of $Q_{45}$, $Q_{46}$, $Q_{47}$, $Q_{48}$, and $Q_{49}$ may be a preset quantity threshold floating around 50%. Further, the frequency of the pulse drive signal may be a resonance frequency of the resonance cavity, that is, a resonance frequency of $C_{42}$ and $L_{42}$.

Because the second input/output terminal 4002 (that is, the second terminal of C1) of the DC/DC converter is an output terminal, the voltage at the two terminals of C1 is equal to an output voltage of the DC/DC converter, and represented as:

$$V_{out}=V_{C1} \qquad \text{Formula 3}$$

The following may be obtained according to formula 1, formula 2, and formula 3:

$$V_{out}=V_{in}/3 \qquad \text{Formula 4}$$

That is, when the first input/output terminal 4001 is an input terminal and the second input/output terminal 4002 is an output terminal, the first voltage gain changeover sub-switch (that is, $Q_{47}$) is connected to the fourth terminal 4044 of the second resonance unit 404 and the second terminal of the first capacitor unit (that is, C1), and a voltage gain of the DC/DC converter is ⅓.

In another possible implementation, the first voltage gain changeover switch is controlled to connect the fourth terminal 4044 of the second resonance unit 404 to the second terminal of the second capacitor unit (that is, C2). In an implementation, the second voltage gain changeover sub-switch $Q_{48}$ is controlled to connect the fourth terminal 4044 of the second resonance unit 404 to the second terminal of the second capacitor unit (that is, C2). In this case, $Q_{48}$ and $Q_{49}$ are controlled to be turned on, and $Q_{45}$ and $Q_{46}$ are controlled to be turned off. In this case, $C_{42}$ and $L_{42}$ are in the discharging mode, and the voltage at two terminals of $C_{42}$ and $L_{42}$ passes $Q_{48}$, C2, C1, and $Q_{49}$, to form the second resonance circuit of the second resonance unit 404. The voltage between the first input/output terminal 4001 and the second terminal of C2 is equal to a voltage at two terminals of C2 and C1, and represented as:

$$V_{in} - V_{C2} - V_{C1} = V_{C2} + V_{C1} \quad \text{Formula 5}$$

The following may be obtained according to formula 1, formula 3, and formula 5:

$$V_{out} = V_{in}/4 \quad \text{Formula 6}$$

That is, when the first input/output terminal 4001 is an input terminal and the second input/output terminal 4002 is an output terminal, the second voltage gain changeover sub-switch (that is, $Q_{48}$) is connected to the fourth terminal 4044 of the second resonance unit 404 and the second terminal of the second capacitor unit (that is, C2), and the voltage gain of the DC/DC converter is ¼.

In this feasible implementation, the DC/DC converter is a buck converter, and configured to connect the fourth terminal 4044 of the second resonance unit 404 to the second terminal of C1 or the second terminal of C2. Therefore, the voltage gain of the DC/DC converter may be switched from ⅓ to ¼ in a same circuit structure. This can improve efficiency and flexibility of voltage gain switching of the DC/DC converter.

In another feasible implementation, the first input/output terminal 4001 of the DC/DC converter is an output terminal, the output voltage is represented by $V_{out}$, the second input/output terminal 4002 is an input terminal, and the input voltage is represented by $V_{in}$. In this case, the first voltage gain changeover switch connects the fourth terminal 4044 of the second resonance unit 404 to the second terminal of the first capacitor unit (that is, C1), or connects the fourth terminal 4044 of the second resonance unit 404 to the second terminal of the second capacitor unit (that is, C2).

In the first resonance unit 403, when $Q_{41}$ and $Q_{42}$ are turned off, $Q_{43}$ and $Q_{44}$ are turned on, $C_{41}$ and $L_{41}$ are in the charging mode, the voltage at the two terminals of C1 passes $Q_{43}$, $C_{41}$, $L_{41}$, and $Q_{44}$, to form the second resonance circuit of the first resonance unit 403. When $Q_{41}$ and $Q_{42}$ are turned on, $Q_{43}$ and $Q_{44}$ are turned off, $C_{41}$ and $L_{41}$ are in the discharging mode, and the voltage at two terminals of $C_{41}$ and $L_{41}$ passes $Q_{41}$, C2, and $Q_{42}$, to form the first resonance circuit of the first resonance unit 403. In this case, $C_{41}$ and $L_{41}$ are charged in the second resonance circuit of the first resonance unit 403 and discharged in the first resonance circuit, and energy is still transferred between the first capacitor unit (that is, C1) and the second capacitor unit (that is, C2), that is, the foregoing formula 1 still holds.

In a possible implementation, the first voltage gain changeover switch is controlled to connect the fourth terminal 4044 of the second resonance unit 404 to the second terminal of the first capacitor unit (that is, C1). That is, the first voltage gain changeover sub-switch $Q_{47}$ is controlled to connect the fourth terminal 4044 of the second resonance unit 404 to the second terminal of the first capacitor unit (that is, C1). In this case, $Q_{47}$ and $Q_{49}$ are turned on, $Q_{45}$ $Q_{46}$ are turned off, and $C_{42}$ and $L_{42}$ are in the charging mode. The voltage at the two terminals of C1 passes $Q_{47}$, $C_{42}$, $L_{42}$, and $Q_{49}$, to form the second resonance circuit of the second resonance unit 404. When $Q_{45}$ and $Q_{46}$ are turned on, $Q_{47}$ and $Q_{49}$ are turned off, $C_{42}$ and $L_{42}$ are in the discharging mode, and the voltage at two terminals of $C_{42}$ and $L_{42}$ passes $Q_{45}$, C4, C1, C2, and $Q_{46}$, to form the first resonance circuit of the second resonance unit 404. In this case, $C_{42}$ and $L_{42}$ are charged in the second resonance circuit of the second resonance unit 404, and discharged in the first resonance circuit. The voltage between the first input/output terminal 4001 and the second terminal of C2 is still equal to the voltage at the two terminals of C1. Therefore, $V_{in}$ in formula 2 may be changed to $V_{out}$, and represented as:

$$V_{out} - V_{C2} - V_{C1} = V_{C1} \quad \text{Formula 7}$$

Because the second input/output terminal 4002 (that is, the second terminal of C1) of the DC/DC converter is an input terminal, the voltage at the two terminals of C1 is equal to an input voltage of the DC/DC converter, and represented as:

$$V_{in} = V_{C1} \quad \text{Formula 8}$$

The following may be obtained according to formula 1, formula 7, and formula 8:

$$V_{out} = 3V_{in} \quad \text{Formula 9}$$

That is, when the first input/output terminal 4001 of the DC/DC converter is an output terminal, the second input/output terminal 4002 is an input terminal, and the first voltage gain changeover sub-switch (that is, $Q_{47}$) connects the fourth terminal 4044 of the second resonance unit 404 to the second terminal of the first capacitor unit (that is, C1), the voltage gain of the DC/DC converter is 3.

In another possible implementation, the first voltage gain changeover switch is controlled to connect the fourth terminal 4044 of the second resonance unit 404 to the second terminal of the second capacitor unit (that is, C2). That is, the second voltage gain changeover sub-switch $Q_{48}$ is controlled to connect the fourth terminal 4044 of the second resonance unit 404 to the second terminal of the second capacitor unit (that is, C2). In this case, $Q_{48}$ and $Q_{49}$ are controlled to be turned on, and $Q_{45}$ and $Q_{46}$ are controlled to be turned off. $C_{42}$ and $L_{42}$ are in the charging mode, and the voltage at the two terminals of C1 and C2 passes $Q_{48}$, $C_{42}$, $L_{42}$, and $Q_{49}$, to form the second resonance circuit of the second resonance unit 404. When $Q_{45}$ and $Q_{46}$ are turned on, $Q_{48}$ and $Q_{49}$ are turned off, $C_{42}$ and $L_{42}$ are in the discharging mode, and the voltage at two terminals of $C_{42}$ and $L_{42}$ passes $Q_{45}$, C4, C1, C2, and $Q_{46}$, to form the first resonance circuit of the second resonance unit 404. In this case, the voltage between the first input/output terminal 4001 and the second terminal of C2 is still equal to the voltage at the two terminals of C1 and C2. Therefore, $V_{in}$ in formula 5 may be changed to $V_{out}$, and represented as:

$$V_{out} - V_{C2} - V_{C1} = V_{C1} + V_{C2} \quad \text{Formula 10}$$

The following may be obtained according to formula 1, formula 8, and formula 10:

$$V_{out} = 4V_{in} \quad \text{Formula 11}$$

That is, when the first input/output terminal 4001 of the DC/DC converter is an output terminal, the second input/output terminal 4002 is an input terminal, and the second voltage gain changeover sub-switch (that is, $Q_{48}$) connects the fourth terminal 4044 of the second resonance unit 404 to the second terminal of the second capacitor unit (that is, C2), the voltage gain of the DC/DC converter is 4.

In this feasible implementation, the DC/DC converter is a boost converter. On the basis of not changing the connection relationship in the DC/DC converter in FIG. 4A, the input terminal and the output terminal of the DC/DC converter may be exchanged, to buck or boost. This can improve the efficiency and the flexibility of the voltage gain switching of the DC/DC converter.

In an optional embodiment, the connection relationship of the DC/DC converter in this embodiment is shown in FIG. 4B. A third capacitor unit is disposed between the first input/output terminal 4001 of the DC/DC converter and the second capacitor unit (that is, C2). The third capacitor unit and the second resonance unit 404 form the first resonance circuit of the second resonance unit 404. The third capacitor unit is C3. A difference from FIG. 4A is that a path for forming a closed circuit with the first resonance circuit of the second resonance unit 404 is different. In this embodiment, when $Q_{45}$ and $Q_{46}$ are turned on, $Q_{47}$, $Q_{48}$, and $Q_{49}$ are turned off, and a voltage at two terminals of C3 passes $Q_{45}$, $C_{42}$, $L_{42}$, and $Q_{46}$, to form the first resonance circuit of the second resonance unit 404 without passing the filter capacitor unit C4 in FIG. 4A. For the second resonance circuit of the second resonance unit and the first resonance unit, refer to the descriptions in FIG. 4A. FIG. 4B is also applicable to the foregoing formula 1 to formula 11, to implement the voltage gain and the beneficial effects described in FIG. 4A. Details are not described herein again.

For example, capacitances of the capacitor units C1, C2, C3, and/or C4 may be the same or different.

Figure 5:
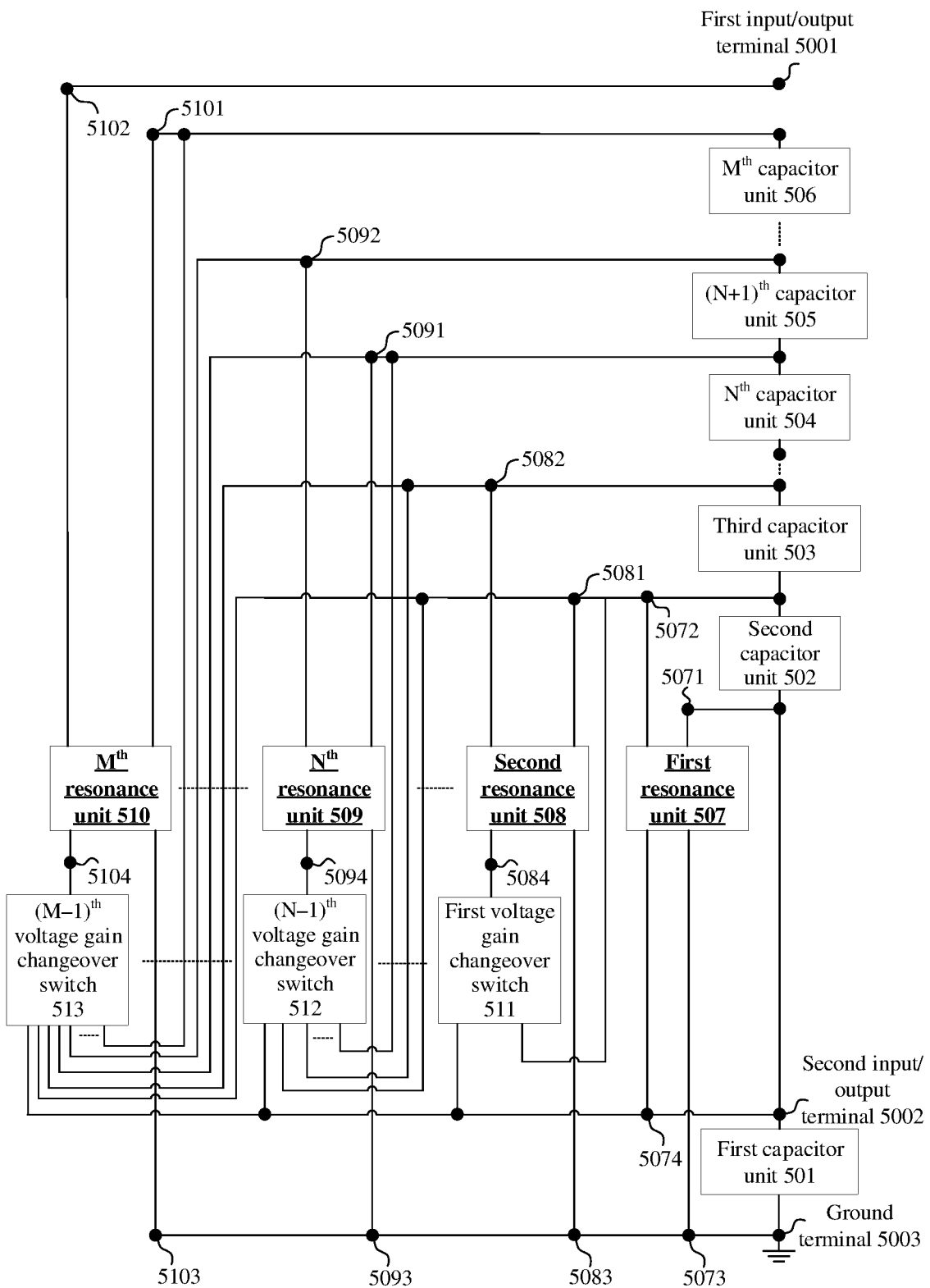
FIG. 5 is a schematic block diagram of another DC/DC converter according to an embodiment.

FIG. 5 is a schematic block diagram of another DC/DC converter according to an embodiment. As shown in FIG. 5, the DC/DC converter in this embodiment has a first input/output terminal 5001, a second input/output terminal 5002, and a ground terminal 5003. The DC/DC converter includes M capacitor units and M resonance units. The M capacitor units include a first capacitor unit 501 and a second capacitor unit 502. The M resonance units include a first resonance unit 507 and a second resonance unit 508. M is an integer not less than 3.

A connection relationship of the DC/DC converter in this embodiment is: A first terminal of the first capacitor unit 501 is connected to the ground terminal 5003 of the DC/DC converter, a second terminal of the first capacitor unit 501 is connected to the second input/output terminal 5002 of the DC/DC converter and a first terminal of the second capacitor unit 502, a second terminal of the second capacitor unit 502 is connected to a first terminal of a third capacitor unit 503, and so on. A first terminal of an $(N+1)^{th}$ capacitor unit 505 in the M capacitor units is connected to a second terminal of an $N^{th}$ capacitor unit 504, a first terminal of an $M^{th}$ capacitor unit 506 in the M capacitor units is connected to a second terminal of an $(M-1)^{th}$ capacitor unit.

A first terminal 5071 and a second terminal 5072 of the first resonance unit 507 are respectively connected to two terminals of the second capacitor unit 502, that is, the first terminal 5071 is connected to the first terminal of the second capacitor unit 502, the second terminal 5072 is connected to the second terminal of the second capacitor unit 502, a third terminal 5073 is connected to the ground terminal 5003 of the DC/DC converter, and a fourth terminal 5074 is connected to the second terminal of the first capacitor unit 501. A first terminal 5081 and a second terminal 5082 of the second resonance unit 508 are respectively connected to two terminals of the third capacitor unit 503, that is, the first terminal 5081 is connected to a first terminal of the third capacitor unit 503, the second terminal 5082 is connected to a second terminal of the third capacitor unit 503, a third terminal 5083 is connected to the ground terminal 5003 of the DC/DC converter, a fourth terminal 5084 is connected to a first voltage gain changeover switch 511, and so on. A first terminal 5091 and a second terminal 5092 of an $N^{th}$ resonance unit 509 in the M resonance units are respectively connected to two terminals of the $(N+1)^{th}$ capacitor unit 505, that is, the first terminal 5091 is connected to a first terminal of the $(N+1)^{th}$ capacitor unit 505, the second terminal 5092 is connected to a second terminal of the $(N+1)^{th}$ capacitor unit 505, and the $N^{th}$ resonance unit 509 and the $(N+1)^{th}$ capacitor unit 505 form a first resonance circuit of the $N^{th}$ resonance unit 509. A third terminal 5093 of the $N^{th}$ resonance unit 509 is connected to the ground terminal 5003 of the DC/DC converter, and a fourth terminal 5094 of the $N^{th}$ resonance unit 509 is connected to an $(N-1)^{th}$ voltage gain changeover switch 512. The $(N-1)^{th}$ voltage gain changeover switch 512 connects the fourth terminal 5094 of the $N^{th}$ resonance unit 509 to a second terminal of any capacitor unit from the first capacitor unit 501 to the $N^{th}$ capacitor unit 504, and N is an integer not less than 2 and not greater than M–1. The $N^{th}$ resonance unit 509, the $(N-1)^{th}$ voltage gain changeover switch 512, and the capacitor unit from the first capacitor unit 501 to the $N^{th}$ capacitor unit 504 form a second resonance circuit of the $N^{th}$ resonance unit 509. In a possible implementation, the $(N-1)^{th}$ voltage gain changeover switch 512 includes N voltage gain changeover sub-switches that respectively correspond to the first capacitor unit 501 to the $N^{th}$ capacitor unit 504. One terminal of each voltage gain changeover sub-switch of the N voltage gain changeover sub-switches is connected to the fourth terminal 5094 of the $N^{th}$ resonance unit 509, and the other terminal of each voltage gain changeover sub-switch is connected to a second terminal of a corresponding capacitor unit.

A first terminal 5101 of an $M^{th}$ resonance unit 510 in the M resonance units is connected to a second terminal of the $M^{th}$ capacitor unit 506, and a second terminal 5102 of the $M^{th}$ resonance unit 510 is connected to the first input/output terminal 5001 of the DC/DC converter. The $M^{th}$ resonance unit 510 and the first capacitor unit 501 to the $M^{th}$ capacitor unit 506 form a first resonance circuit of the $M^{th}$ resonance unit 510. A third terminal 5103 of the $M^{th}$ resonance unit 510 is connected to the ground terminal 5003 of the DC/DC converter, a fourth terminal 5104 of the $M^{th}$ resonance unit 510 is connected to an $(M-1)^{th}$ voltage gain changeover switch 513. The $(M-1)^{th}$ voltage gain changeover switch 513 connects the fourth terminal 5104 of the $M^{th}$ resonance unit 510 to a second terminal of any capacitor unit from the first capacitor unit 501 to the $M^{th}$ capacitor unit 506. In a possible implementation, the $(M-1)^{th}$ voltage gain changeover switch 513 includes M voltage gain changeover sub-switches that respectively correspond to the M capacitor units. One terminal of each voltage gain changeover sub-switch of the M voltage gain changeover sub-switches is connected to the fourth terminal 5104 of the $M^{th}$ resonance unit 510, and the other terminal of each voltage gain changeover sub-switch is connected to a second terminal of a corresponding capacitor unit.

Optionally, the $(N-1)^{th}$ voltage gain changeover switch 512 connects the fourth terminal 5094 of the $N^{th}$ resonance unit 509 to the second terminal of any capacitor unit from the first capacitor unit 501 to the $N^{th}$ capacitor unit 504, and the $(M-1)^{th}$ voltage gain changeover switch 513 connects the fourth terminal 5104 of the $M^{th}$ resonance unit 510 to the second terminal of any capacitor unit from the first capacitor unit 501 to the $M^{th}$ capacitor unit 506. Therefore, the DC/DC converter may have 1×2× . . . ×M combinations of forming a resonance circuit.

Further, in an optional embodiment, when the first input/output terminal 5001 of the DC/DC converter in this embodiment is an input terminal, and the second input/output terminal 5002 is an output terminal, a voltage gain of the DC/DC converter in this embodiment is between $1/2^N$ and $1/(N+1)$. However, when the first input/output terminal 5001 of the DC/DC converter in this embodiment is an output terminal, and the second input/output terminal 5002 is an input terminal, the voltage gain of the DC/DC converter in this embodiment is between N+1 and $2^N$.

In a feasible implementation, a filter capacitor unit is connected between the first input/output terminal 5001 and the ground terminal 5003 of the DC/DC converter. The filter capacitor unit is configured to provide the $M^{th}$ resonance unit 510 with a path for forming a closed circuit with the first input/output terminal 5001.

In another feasible implementation, an $(M+1)^{th}$ capacitor unit is disposed between the first input/output terminal 5001 of the DC/DC converter and the second terminal of the second capacitor unit 502. The $(M+1)^{th}$ capacitor unit provides the $M^{th}$ resonance unit 510 with the path for forming a closed circuit with the first input/output terminal 5001, that is, the $(M+1)^{th}$ capacitor unit and the $M^{th}$ resonance unit 510 form the first resonance circuit of the $M^{th}$ resonance unit 510.

In a possible implementation, the $(N-1)^{th}$ voltage gain changeover switch 512 and/or the $M^{th}$ voltage gain changeover switch 513 may be a mechanical switch. The mechanical switch implements voltage gain switching by mechanical operations, for example, a button switch or a toggle switch.

In another possible implementation, the $(N-1)^{th}$ voltage gain changeover switch 512 and/or the $M^{th}$ voltage gain changeover switch 513 may be an electronic switch. The electronic switch implements the voltage gain switching by using a controllable electronic driving component, for example, a relay, a contactor, a MOSFET, or an IGBT and an anti-parallel diode thereof. When receiving a voltage gain switching signal, the $(N-1)^{th}$ voltage gain changeover switch 512 connects the fourth terminal 5094 of the $N^{th}$ resonance unit 509 to the second terminal of any capacitor unit from the first capacitor unit 501 to the $N^{th}$ capacitor unit 504. When receiving the voltage gain switching signal, the $M^{th}$ voltage gain changeover switch 513 connects the fourth terminal 5104 of the $M^{th}$ resonance unit 510 to the second terminal of any capacitor unit from the first capacitor unit 501 to the $M^{th}$ capacitor unit 506. For example, the voltage gain switching signal received by the $(N-1)^{th}$ voltage gain changeover switch 512 may be generated by a system controller that is connected to the $(N-1)^{th}$ voltage gain changeover switch, and the voltage gain switching signal received by the $M^{th}$ voltage gain changeover switch 513 may be generated by a system controller that is connected to the $M^{th}$ voltage gain changeover switch. The system controller that is connected to the $(N-1)^{th}$ voltage gain changeover switch 512 sends the voltage gain switching signal to the $(N-1)^{th}$ voltage gain changeover switch 512, so that the $(N-1)^{th}$ voltage gain changeover switch 512 connects, based on the voltage gain switching signal, the fourth terminal 5094 of the $N^{th}$ resonance unit 509 to the second terminal of any capacitor unit from the first capacitor unit 501 to the $N^{th}$ capacitor unit 504. The system controller that is connected to the $M^{th}$ voltage gain changeover switch 513 sends the voltage gain switching signal to the $M^{th}$ voltage gain changeover switch 513, so that the $M^{th}$ voltage gain changeover switch 513 connects, based on the voltage gain switching signal, the fourth terminal 5104 of the $M^{th}$ resonance unit 510 to the second terminal of any capacitor unit from the first capacitor unit 501 to the $M^{th}$ capacitor unit 506. The system controller that is connected to the $(N-1)^{th}$ voltage gain changeover switch 512 and the system controller that is connected to the $M^{th}$ voltage gain changeover switch 513 may be the same system controller or different system controllers.

In a feasible implementation, the $(N-1)^{th}$ voltage gain changeover switch 512 in this embodiment may be a mechanical switch, and the $M^{th}$ voltage gain changeover switch 513 may be an electronic switch, or vice versa. Further, in an optional implementation, each voltage gain changeover sub-switch may include a mechanical switch and/or an electronic switch.

Compared with the DC/DC converter described in FIG. 2, the DC/DC converter in this embodiment may implement a plurality of voltage gains, that is, a fourth terminal of a resonance unit may be connected to a second terminal of a different capacitor unit by adding a capacitor unit, a resonance unit, and a voltage gain changeover switch, to increase a quantity of output voltage values of the DC/DC converter. The following provides detailed description with reference to a circuit schematic diagram.

Figure 6A:
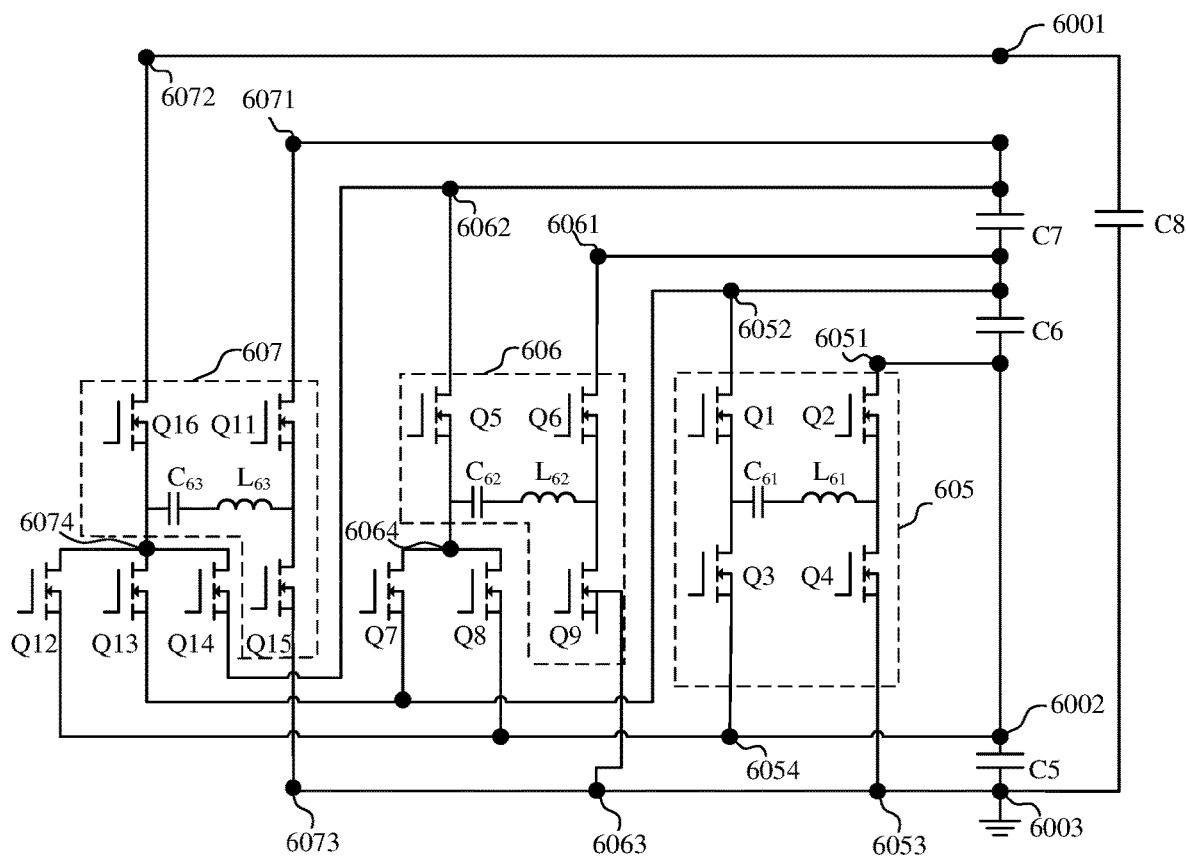
FIG. 6A is a diagram of a circuit of another DC/DC converter according to an embodiment.
Figure 6B:
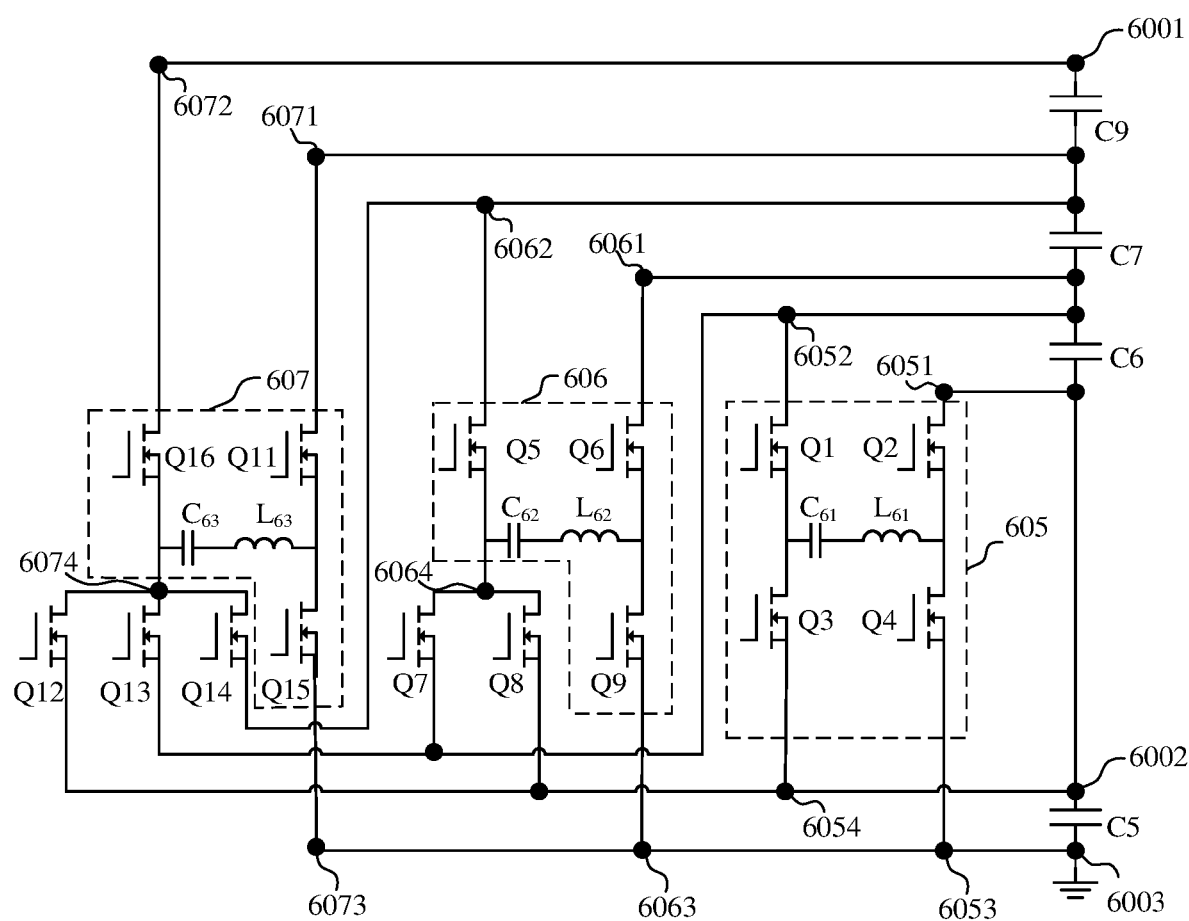
FIG. 6B is a diagram of a circuit of another DC/DC converter according to an embodiment.

With reference to FIG. 6A to FIG. 6B, the following describes how the DC/DC converter implements a plurality of voltage gain switching. FIG. 6A uses an example in which the DC/DC converter includes three resonance units and three capacitor units, but is not exhaustive. It should be understood that the DC/DC converter may include M capacitor units and M resonance units, and M is an integer not less than 3.

As shown in FIG. 6A, the DC/DC converter has a first input/output terminal 6001, a second input/output terminal 6002, and a ground terminal 6003. The DC/DC converter includes a first capacitor unit, a second capacitor unit, a third capacitor unit, a first resonance unit 605, a second resonance unit 606, and a third resonance unit 607. FIG. 6A uses an example in which the first capacitor unit is C5, the second capacitor unit is C6, and the third capacitor unit is C7.

Two terminals of C5 are connected between the second input/output terminal 6002 and the ground terminal 6003. A first terminal of C6 is connected to a second terminal of C5 (that is, the second input/output terminal 6002), and a second terminal of C6 is connected to a second terminal 6052 of the first resonance unit 605 and a first terminal of C7. A second terminal of C7 is connected to a second terminal 6062 of the second resonance unit 606.

Switching transistors are disposed in each resonance unit. The switching transistor may be a contactor, a relay, a MOSFET, or an IGBT and an anti-parallel diode thereof. FIG. 6A uses an example in which the switching transistor is a MOSFET.

Switching transistors in the first resonance unit 605 include Q1, Q2, Q3, and Q4. A resonance cavity is further disposed in the first resonance unit 605. The resonance cavity includes, but is not limited to, a capacitor $C_{61}$ and an inductor $L_{61}$. A connection relationship of the first resonance unit 605 is: Q1 and Q3 are connected, and Q2 and Q4 are connected. A source of Q1 is connected to a drain of Q3, and a source of Q2 is connected to a drain of Q4. $C_{61}$ and $L_{61}$ are connected in series between a fourth junction and a fifth junction. The fourth junction is a junction at which the source of Q1 is connected to the drain of Q3, and the fifth junction is a junction at which the source of Q2 is connected to the drain of Q4. A drain of Q2 is used as a first terminal 6051 of the first resonance unit 605, a drain of Q1 is used as the second terminal 6052 of the first resonance unit 605, a source of Q4 is used as a third terminal 6053 of the first resonance unit 605, and a source of Q3 is used as a fourth terminal 6054 of the first resonance unit 605.

Switching transistors in the second resonance unit 606 include Q5, Q6, and Q9. A resonance cavity is further disposed in the second resonance unit 606. The resonance cavity includes, but is not limited to, a capacitor $C_{62}$ and an inductor $L_{62}$. A connection relationship of the second resonance unit 606 is: A drain of Q5 is used as the second terminal 6062 of the second resonance unit 606, and a source of Q5 is used as a fourth terminal 6064 of the second resonance unit 606. Q6 is connected to Q9. A source of Q6 is connected to a drain of Q9. A drain of Q6 is used as a first terminal 6061 of the second resonance unit 606, and a source of is Q9 used as a third terminal 6063 of the second resonance unit 606. $C_{62}$ and $L_{62}$ are connected in series between a sixth junction and the fourth terminal 6064 of the second resonance unit 606. The sixth junction is a junction at which the source of Q6 is connected to the drain of Q9. The fourth terminal 6064 of the second resonance unit 606 is connected to a first voltage gain changeover switch. The first voltage gain changeover switch connects the fourth terminal 6064 of the second resonance unit 606 to a second terminal of the first capacitor unit (that is, C5), or connects the fourth terminal 6064 of the second resonance unit 606 to a second terminal of the second capacitor unit (that is, C6). In a feasible implementation, the first voltage gain changeover switch may include a first voltage gain changeover sub-switch and a second voltage gain changeover sub-switch. For example, FIG. 6A uses an example in which the first voltage gain changeover switch is a MOSFET. The first voltage gain changeover sub-switch is Q8, and the second voltage gain changeover sub-switch is Q7. One terminal of the first voltage gain changeover sub-switch and one terminal of the second voltage gain changeover sub-switch are connected to a fourth terminal 6044 of a second resonance unit 604, that is, a drain of Q7 and a drain of Q8 are connected to the fourth terminal 6064 of the second resonance unit 606. The other terminal of the first voltage gain changeover sub-switch and the other terminal of the second voltage gain changeover sub-switch are respectively connected to second terminals of corresponding capacitor units, that is, a source of Q8 is connected to the second terminal of C5 (that is, the second input/output terminal 6002), and a source of Q7 is connected to the second terminal of C6.

Switching transistors in the third resonance unit 607 include Q16, Q11, and Q15. A resonance cavity is further disposed in the third resonance unit 607. The resonance cavity includes, but is not limited to, a capacitor $C_{63}$ and an inductor $L_{63}$. A connection relationship of the third resonance unit 607 is: A drain of Q16 is used as a second terminal 6072 of the third resonance unit 607, and a source of Q16 is used as a fourth terminal 6074 of the third resonance unit 607. Q11 is connected to Q15. A source of Q11 is connected to a drain of Q15. A drain of Q11 is used as a first terminal 6071 of the third resonance unit 607, and a source of Q15 is used as a third terminal 6073 of the third resonance unit 607. $C_{63}$ and $L_{63}$ are connected in series between a seventh junction and the fourth terminal 6074 of the third resonance unit 607. The seventh junction is a junction at which the source of Q11 is connected to the drain of Q15. The fourth terminal 6074 of the third resonance unit 607 is connected to a second voltage gain changeover switch. The second voltage gain changeover switch connects the fourth terminal 6074 of the third resonance unit 607 to the second terminal of the first capacitor unit (that is, C5), connects the fourth terminal 6074 of the third resonance unit 607 to the second terminal of the second capacitor unit (that is, C6), or connects the fourth terminal 6074 of the third resonance unit 607 to a second terminal of the third capacitor unit (that is, C7). In a feasible implementation, the second voltage gain changeover switch may include three voltage gain changeover sub-switches that respectively correspond to the first capacitor unit to the third capacitor unit (that is, C5, C6, and C7), that is, Q12, Q13, and Q14 shown in FIG. 6A. One terminal of each voltage gain changeover sub-switch is connected to the fourth terminal 6074 of the third resonance unit 607, that is, a drain of Q12, a drain of Q13, and a drain of Q14 are all connected to the fourth terminal 6074 of the third resonance unit 607. The other terminal of each voltage gain changeover sub-switch is connected to a second terminal of a corresponding capacitor unit, that is, a source of Q12 is connected to the second terminal of C5 (that is, the second input/output terminal 6002), a source of Q13 is connected to the second terminal of C6, and a source of Q14 is connected to the second terminal of C7.

The following describes how the DC/DC converter shown in FIG. 6A implements different voltage gain switching.

In a feasible implementation, the first input/output terminal 6001 of the DC/DC converter is an input terminal, an input voltage is represented by $V_{in1}$, the second input/output terminal 6002 is an output terminal, and an output voltage is represented by $V_{out1}$. In this case, the first voltage gain changeover switch connects the fourth terminal 6064 of the second resonance unit 606 to the second terminal of the first capacitor unit (that is, C5) or the second terminal of the second capacitor unit (that is, C6). The second voltage gain changeover switch connects the fourth terminal 6074 of the third resonance unit 607 to the second terminal of the first capacitor unit (that is, C5), the second terminal of the second capacitor unit (that is, C6), or the second terminal of the third capacitor unit (that is, C7). Therefore, the DC/DC converter has six combinations of forming a resonance circuit.

In any method of forming a resonance circuit, Q1 and Q2 in a first resonance circuit of the first resonance unit 605 are complementarily connected to Q3 and Q4 in a second resonance circuit, that is, when Q1 and Q2 are turned on, Q3 and Q4 are turned off, or vice versa. When Q1 and Q2 are turned on, Q3 and Q4 are turned off, a voltage at two terminals of C6 passes Q1, $C_{61}$, $L_{61}$, and Q2, to form the first resonance circuit of the first resonance unit 605. In this case, $C_{61}$ and $L_{61}$ are in a charging mode. When Q1 and Q2 are turned off, Q3 and Q4 are turned on, and a voltage at two terminals of $C_{61}$ and $L_{61}$ passes Q3, C5, and Q4, to form the second resonance circuit of the first resonance unit 605. If charging time and discharging time of $C_{61}$ and $L_{61}$ are the same, the voltage at two terminals of C6 is equal to a voltage at the two terminals of C5, and represented as:

$$V_{C6}=V_{C5} \qquad \text{Formula 12}$$

In an optional embodiment, the first voltage gain changeover switch is controlled to connect the fourth terminal 6064 of the second resonance unit 606 to the second terminal of the first capacitor unit (that is, C5), that is, Q8 is controlled to be turned on, and Q7 is controlled to be turned off.

Q5 and Q6 in a first resonance circuit of the second resonance unit 606 are complementarily connected to Q8 and Q9 in the second resonance circuit, that is, when Q5 and Q6 are turned on, Q8 and Q9 are turned off, or vice versa. When Q5 and Q6 are turned on, Q8 and Q9 are turned off, and a voltage at two terminals of C7 passes Q5, $C_{62}$, $L_{62}$, and Q6, to form the first resonance circuit of the second resonance unit 606. In this case, $C_{62}$ and $L_{62}$ are in the charging mode. When Q5 and Q6 are turned off, Q8 and Q9 are turned on, and a voltage at two terminals of $C_{62}$ and $L_{62}$ passes Q8, C5, and Q9, to form the second resonance circuit of the second resonance unit 606. In this case, $C_{62}$ and $L_{62}$ are in a discharging mode. If charging time and discharging time of $C_{62}$ and $L_{62}$ are the same, the voltage $V_{C7}$ at two terminals of C7 is equal to the voltage $V_{C5}$ at the two terminals of C5, and represented as:

$$V_{C7}=V_{C5} \quad \text{Formula 13}$$

In a possible implementation, the second voltage gain changeover switch is controlled to connect the fourth terminal 6074 of the third resonance unit 607 to the second terminal of the first capacitor unit (that is, C5), that is, Q12 is controlled to be turned on, and Q13 and Q14 are controlled to be turned off.

In an implementation, Q16 and Q11 in a first resonance circuit of the third resonance unit 607 are complementarily connected to Q12 and Q15 in the second resonance circuit, that is, when Q16 and Q11 are connected, Q12 and Q15 are turned off, or vice versa. When Q16 and Q11 are turned on, Q12 and Q15 are turned off, and a voltage between the first input/output terminal 6001 and the second terminal of C7 of the DC/DC converter passes Q16, $C_{63}$, $L_{63}$, Q11, C7, C6, C5, and C8, to form the first resonance circuit of the third resonance unit 607; and C8 is a filter capacitor unit that is connected between the first input/output terminal 6001 and the ground terminal 6003 of the DC/DC converter. In this case, $C_{63}$ and $L_{63}$ are in the charging mode. When Q16 and Q11 are turned off, Q12 and Q15 are turned on, and a voltage at two terminals of $C_{63}$ and $L_{63}$ passes Q12, C5, and Q15, to form the second resonance circuit of the third resonance unit 607. If charging time and discharging time of $C_{63}$ and $L_{63}$ are the same, the voltage between the first input/output terminal 6001 and the second terminal of C7 is equal to the voltage at the two terminals of C5, and represented as:

$$V_{in1}-V_{C7}-V_{C6}-V_{C5}-V_{C5} \quad \text{Formula 14}$$

Because the second input/output terminal 6002 (that is, the second terminal of C5) of the DC/DC converter is an output terminal, and an output voltage is represented by $V_{out1}$, the voltage at the two terminals of C5 is equal to an output voltage of the DC/DC converter, and represented as:

$$V_{out1}=V_{C5} \quad \text{Formula 15}$$

The following may be obtained according to formula 12, formula 13, formula 14, and formula 15:

$$V_{out1}=V_{in1}/4 \quad \text{Formula 16}$$

For example, the first resonance unit 605, the second resonance unit 606, and the third resonance unit 607 may be synchronously turned on or off or may be alternately turned on or off. Duty cycles of pulse drive signals of the switching transistors, for example, Q1, Q2, Q3, and Q4 may be a preset quantity threshold floating around 50%. Further, a frequency of the pulse drive signal may be a resonance frequency of the resonance cavity, that is, a resonance frequency of $C_{62}$ and $L_{62}$.

That is, when the first input/output terminal 6001 of the DC/DC converter is an input terminal, the second input/output terminal 6002 is an output terminal, the first voltage gain changeover switch connects the fourth terminal 6064 of the second resonance unit 606 to the second terminal of the first capacitor unit (that is, C5), and the second voltage gain changeover switch connects the fourth terminal 6074 of the third resonance unit 607 to the second terminal of the first capacitor unit (that is, C5), a voltage gain of the DC/DC converter is ¼.

In another possible implementation, the second voltage gain changeover switch is controlled to connect the fourth terminal 6074 of the third resonance unit 607 to the second terminal of the second capacitor unit (that is, C6), that is, Q13 is controlled to be turned on, and Q12 and Q14 are controlled to be turned off.

In an implementation, Q16 and Q11 in the first resonance circuit of the third resonance unit 607 are complementarily connected to Q13 and Q15 in the second resonance circuit, that is, when Q16 and Q11 are connected, Q13 and Q15 are turned off, or vice versa. When Q16 and Q11 are turned on, Q13 and Q15 are turned off, and the voltage between the first input/output terminal 6001 and the second terminal of C7 of the DC/DC converter passes Q16, $C_{63}$, $L_{63}$, Q11, C7, C6, C5, and C8, to form the first resonance circuit of the third resonance unit 607. In this case, $C_{63}$ and $L_{63}$ are in the charging mode. When Q16 and Q11 are turned off, Q13 and Q15 are turned on, and the voltage at two terminals of $C_{63}$ and $L_{63}$ passes Q13, C6, C5, Q15, to form the second resonance circuit of the third resonance unit 607. If the charging time and the discharging time of $C_{63}$ and $L_{63}$ are the same, the voltage between the first input/output terminal 6001 and the second terminal of C7 is equal to a voltage at two terminals of C6 and C5, and represented as:

$$V_{in1}-V_{C7}-V_{C6}-V_{C5}=V_{C6}+V_{C5} \quad \text{Formula 17}$$

The following may be obtained according to formula 12, formula 13, formula 15, and formula 17:

$$V_{out1}=V_{in1}/5 \quad \text{Formula 18}$$

That is, when the first input/output terminal 6001 of the DC/DC converter is an input terminal, the second input/output terminal 6002 is an output terminal, the first voltage gain changeover switch connects the fourth terminal 6064 of the second resonance unit 606 to the second terminal of the first capacitor unit (that is, C5), and the second voltage gain changeover switch connects the fourth terminal 6074 of the third resonance unit 607 to the second terminal of the second capacitor unit (that is, C6), the voltage gain of the DC/DC converter is ⅕.

In still another possible implementation, the second voltage gain changeover switch is controlled to connect the fourth terminal 6074 of the third resonance unit 607 to the second terminal of the third capacitor unit (that is, C7), that is, Q14 is controlled to be turned on, and Q12 and Q13 are controlled to be turned off.

In an implementation, Q16 and Q11 in the first resonance circuit of the third resonance unit 607 are complementarily connected to Q14 and Q15 in the second resonance circuit, that is, when Q16 and Q11 are connected, Q14 and Q15 are turned off, or vice versa. When Q16 and Q11 are turned on, Q14 and Q15 are turned off, and the voltage between the first input/output terminal 6001 and the second terminal of C7 of the DC/DC converter passes Q16, $C_{63}$, $L_{63}$, Q11, C7, C6, C5, and C8, to form the first resonance circuit of the third resonance unit 607. In this case, $C_{63}$ and $L_{63}$ are in the charging mode. When Q16 and Q11 are turned off, Q14 and Q15 are turned on, and the voltage at two terminals of $C_{63}$ and $L_{63}$ passes Q14, C7, C6, C5, and Q15, to form the second resonance circuit of the third resonance unit 607. If the charging time and the discharging time of $C_{63}$ and $L_{63}$ are the same, the voltage between the first input/output terminal 6001 and the second terminal of C7 is equal to a voltage at C7, C6, and C5, and represented as:

$$V_{in1}-V_{C7}-V_{C6}-V_{C5}=V_{C7}+V_{C6}+V_{C5} \quad \text{Formula 19}$$

The following may be obtained according to formula 12, formula 13, formula 15, and formula 19:

$$V_{out1}=V_{in1}/6 \quad \text{Formula 20}$$

That is, when the first input/output terminal 6001 of the DC/DC converter is an input terminal, the second input/output terminal 6002 is an output terminal, the first voltage gain changeover switch connects the fourth terminal 6064 of the second resonance unit 606 to the second terminal of the first capacitor unit (that is, C5), and the second voltage gain changeover switch connects the fourth terminal 6074 of the third resonance unit 607 to the second terminal of the third capacitor unit (that is, C7), the voltage gain of the DC/DC converter is ⅕.

In another optional embodiment, the first voltage gain changeover switch is controlled to connect the fourth terminal 6064 of the second resonance unit 606 to the second terminal of the second capacitor unit (that is, C6), that is, Q8 is controlled to be turned off, and Q7 is controlled to be turned on.

Q5 and Q6 in the first resonance circuit of the second resonance unit 606 are complementarily connected to Q7 and Q9 in the second resonance circuit, that is, when Q5 and Q6 are turned on, Q7 and Q9 are turned off, or vice versa. When Q5 and Q6 are turned on, Q7 and Q9 are turned off, the voltage at two terminals of C7 passes Q5, $C_{62}$, $L_{62}$, and Q6, to form the first resonance circuit of the second resonance unit 606. In this case, $C_{62}$ and $L_{62}$ are in the charging mode. When Q5 and Q6 are turned off, Q7 and Q9 are turned on, and the voltage at two terminals of $C_{62}$ and $L_{62}$ passes Q7, C6, C5, and Q9, to form the second resonance circuit of the second resonance unit 606. If the charging time and the discharging time of $C_{62}$ and $L_{62}$ are the same, a voltage at two terminals of C7 $V_{C7}$ is equal to the voltage at two terminals of C6 and C5, and represented as:

$$V_{C7}=V_{C5}+V_{C6}\qquad\text{Formula 21}$$

In a possible implementation, the second voltage gain changeover switch is controlled to connect the fourth terminal 6074 of the third resonance unit 607 to the second terminal of the first capacitor unit (that is, C5), that is, Q12 is controlled to be turned on, and Q13 and Q14 are controlled to be turned off. In this case, the following may be obtained according to formula 12, formula 14, formula 15, and formula 21:

$$V_{out1}=V_{in1}/5\qquad\text{Formula 22}$$

That is, when the first input/output terminal 6001 of the DC/DC converter is an input terminal, the second input/output terminal 6002 is an output terminal, the first voltage gain changeover switch connects the fourth terminal 6064 of the second resonance unit 606 to the second terminal of the second capacitor unit (that is, C6), and the second voltage gain changeover switch connects the fourth terminal 6074 of the third resonance unit 607 to the second terminal of the first capacitor unit (that is, C5), the voltage gain of the DC/DC converter is ⅕.

In another possible implementation, the second voltage gain changeover switch is controlled to connect the fourth terminal 6074 of the third resonance unit 607 to the second terminal of the second capacitor unit (that is, C6), that is, Q13 is controlled to be turned on, and Q12 and Q14 are controlled to be turned off. In this case, the following may be obtained according to formula 12, formula 15, formula 17, and formula 21:

$$V_{out1}=V_{in1}/6\qquad\text{Formula 23}$$

That is, when the first input/output terminal 6001 of the DC/DC converter is an input terminal, the second input/output terminal 6002 is an output terminal, the first voltage gain changeover switch connects the fourth terminal 6064 of the second resonance unit 606 to the second terminal of the second capacitor unit (that is, C6), and the second voltage gain changeover switch connects the fourth terminal 6074 of the third resonance unit 607 to the second terminal of the second capacitor unit (that is, C6), the voltage gain of the DC/DC converter is ⅙.

In still another possible implementation, the second voltage gain changeover switch is controlled to connect the fourth terminal 6074 of the third resonance unit 607 to the second terminal of the third capacitor unit (that is, C7), that is, Q14 is controlled to be turned on, and Q12 and Q13 are controlled to be turned off. In this case, the following may be obtained according to formula 12, formula 15, formula 19, and formula 21:

$$V_{out1}=V_{in1}/8\qquad\text{Formula 24}$$

That is, when the first input/output terminal 6001 of the DC/DC converter is an input terminal, the second input/output terminal 6002 is an output terminal, the first voltage gain changeover switch connects the fourth terminal 6064 of the second resonance unit 606 to the second terminal of the second capacitor unit (that is, C6), and the second voltage gain changeover switch connects the fourth terminal 6074 of the third resonance unit 607 to the second terminal of the third capacitor unit (that is, C7), the voltage gain of the DC/DC converter is ⅛.

In conclusion, if the DC/DC converter includes three resonance units, the first input/output terminal 6001 is an input terminal, and the second input/output terminal 6002 is an output terminal, a voltage gain that may be implemented by the DC/DC converter may be ¼, ⅕, ⅙, and ⅛.

In another feasible implementation, the first input/output terminal 6001 of the DC/DC converter is an output terminal, an output voltage is represented by $V_{out1}$, the second input/output terminal 6002 is an input terminal, and an input voltage is represented by $V_{in1}$. In this case, the DC/DC converter still has six combinations of forming a resonance circuit.

In the any method of forming a resonance circuit, when Q1 and Q2 are turned off, Q3 and Q4 turned on, $C_{61}$ and $L_{61}$ are in the charging mode, and the voltage at the two terminals of C5 passes Q3, $C_{61}$, $L_{61}$, and Q3, to form the second resonance circuit of the first resonance unit 605. When Q1 and Q2 are turned on, Q3 and Q4 are turned off, $C_{61}$ and $L_{61}$ are in the discharging mode, and the voltage at two terminals of $C_{61}$ and $L_{61}$ passes Q1, C6, and Q2, to form the first resonance circuit of the first resonance unit 605. $C_{61}$ and $L_{61}$ are charged in the second resonance circuit of the first resonance unit 605 and discharged in the first resonance circuit, and energy is still transferred between two terminals of C5 and C6, that is, formula 12 still holds.

In an optional embodiment, the first voltage gain changeover switch is controlled to connect the fourth terminal 6064 of the second resonance unit 606 to the second terminal of the first capacitor unit (that is, C5), that is, Q8 is controlled to be turned on, and Q7 is controlled to be turned off.

When Q5 and Q6 are turned off, Q8 and Q9 are turned on, and the voltage at the two terminals of C5 passes Q8, $C_{62}$, $L_{62}$, and Q9, to form the second resonance circuit of the second resonance unit 606. In this case, $C_{62}$ and $L_{62}$ are in the charging mode. When Q5 and Q6 are turned on, Q8 and Q9 are turned off, and the voltage at two terminals of $C_{62}$ and $L_{62}$ passes Q5, C7, and Q6, to form the first resonance circuit of the second resonance unit 606. In this case, $C_{62}$ and $L_{62}$ are in the discharging mode. $C_{62}$ and $L_{62}$ are charged in the second resonance circuit of the second resonance unit 606 and discharged in the first resonance circuit, and the energy is still transferred between two terminals of C5 and C7, that is, formula 13 still holds.

In a possible implementation, the second voltage gain changeover switch is controlled to connect the fourth terminal 6074 of the third resonance unit 607 to the second terminal of the first capacitor unit (that is, C5), that is, Q12 is controlled to be turned on, and Q13 and Q14 are controlled to be turned off.

In an implementation, when Q12 and Q15 are turned on, Q16 and Q11 are turned off, and the voltage at the two terminals of C5 passes Q12, $C_{63}$, $L_{63}$, and Q15, to form the second resonance circuit of the third resonance unit 607. In this case, $C_{63}$ and $L_{63}$ are in the charging mode. When Q16 and Q11 are turned on, Q12 and Q15 are turned off, and the voltage at two terminals of $C_{63}$ and $L_{63}$ passes Q16, C8, C5, C6, C7, and Q11, to form the first resonance circuit of the third resonance unit 607. In this case, $C_{63}$ and $L_{63}$ are in the discharging mode. In this case, $C_{63}$ and $L_{63}$ are charged in the second resonance circuit and discharged in the first resonance circuit, and the voltage at the two terminals of C5 is still equal to the voltage between the first input/output terminal 6001 and the second terminal of C7. Therefore, $V_{in1}$ in the foregoing formula 14 may be changed to $V_{out1}$, and represented as:

$$V_{out1} - V_{C7} - V_{C6} - V_{C5} = V_{C5} \qquad \text{Formula 25}$$

Because the second input/output terminal 6002 (that is, the second terminal of C5) of the DC/DC converter is an input terminal, the voltage at the two terminals of C5 is equal to an input voltage of the DC/DC converter, and represented as:

$$V_{in1} = V_{C5} \qquad \text{Formula 26}$$

The following may be obtained according to formula 12, formula 13, formula 25, and formula 26:

$$V_{out1} = 4 V_{in1} \qquad \text{Formula 27}$$

That is, when the first input/output terminal 6001 of the DC/DC converter is an output terminal, the second input/output terminal 6002 is an input terminal, the first voltage gain changeover switch connects the fourth terminal 6064 of the second resonance unit 606 to the second terminal of the first capacitor unit (that is, C5), and the second voltage gain changeover switch connects the fourth terminal 6074 of the third resonance unit 607 to the second terminal of the first capacitor unit (that is, C5), the voltage gain of the DC/DC converter is 4.

In another possible implementation, the second voltage gain changeover switch is controlled to connect the fourth terminal 6074 of the third resonance unit 607 to the second terminal of the second capacitor unit (that is, C6), that is, Q13 is controlled to be turned on, and Q12 and Q14 are controlled to be turned off.

In an implementation, when Q16 and Q11 are turned off, Q13 and Q15 are turned on, and the voltage at two terminals of C6 and C5 passes Q13, $C_{63}$, $L_{63}$, and Q15, to form the second resonance circuit of the third resonance unit 607. In this case, $C_{63}$ and $L_{63}$ are in the charging mode. When Q16 and Q11 are turned on, Q13 and Q15 are turned off, and the voltage at two terminals of $C_{63}$ and $L_{63}$ passes Q16, C8, C5, C6, C7, and Q11, to form the first resonance circuit of the third resonance unit 607. In this case, $C_{63}$ and $L_{63}$ are in the discharging mode. In this case, $C_{63}$ and $L_{63}$ are charged in the second resonance circuit and discharged in the first resonance circuit, and the voltage at two terminals of C6 and C5 is still equal to the voltage between the first input/output terminal 6001 and the second terminal of C7. Therefore, $V_{in1}$ in the foregoing formula 17 may be changed to $V_{out1}$, and represented as:

$$V_{out1} - V_{C7} - V_{C6} - V_{C5} = V_{C6} + V_{C5} \qquad \text{Formula 28}$$

The following may be obtained according to formula 12, formula 13, formula 26, and formula 28:

$$V_{out1} = 5 V_{in1} \qquad \text{Formula 29}$$

That is, when the first input/output terminal 6001 of the DC/DC converter is an output terminal, the second input/output terminal 6002 is an input terminal, the first voltage gain changeover switch connects the fourth terminal 6064 of the second resonance unit 606 to the second terminal of the first capacitor unit (that is, C5), and the second voltage gain changeover switch connects the fourth terminal 6074 of the third resonance unit 607 to the second terminal of the second capacitor unit (that is, C6), the voltage gain of the DC/DC converter is 5.

In still another possible implementation, the second voltage gain changeover switch is controlled to connect the fourth terminal 6074 of the third resonance unit 607 to the second terminal of the third capacitor unit (that is, C7), that is, Q14 is controlled to be turned on, and Q12 and Q13 are controlled to be turned off.

In an implementation, when Q16 and Q11 are turned off, Q14 and Q15 are turned on, and a voltage at two terminals of C7, C6, and C5 passes Q14, $C_{63}$, $L_{63}$, and Q15, to form the second resonance circuit of the third resonance unit 607. In this case, $C_{63}$ and $L_{63}$ are in the charging mode. When Q16 and Q11 are turned on, Q14 and Q15 are turned off, and the voltage at two terminals of $C_{63}$ and $L_{63}$ passes Q16, C8, C5, C6, C7, and Q11, to form the first resonance circuit of the third resonance unit 607. In this case, $C_{63}$ and $L_{63}$ are in the discharging mode. In this case, $C_{63}$ and $L_{63}$ are charged in the second resonance circuit and discharged in the first resonance circuit, and the voltage at the two terminals of C7, C6, and C5 is still equal to the voltage between the first input/output terminal 6001 and the second terminal of C7. Therefore, $V_{in1}$ in the foregoing formula 19 may be changed to $V_{out1}$, and represented as:

$$V_{out1} - V_{C7} - V_{C6} - V_{C5} = V_{C7} + V_{C6} + V_{C5} \qquad \text{Formula 30}$$

The following may be obtained according to formula 12, formula 13, formula 26, and formula 30:

$$V_{out1} = 6 V_{in1} \qquad \text{Formula 31}$$

In another optional embodiment, the first voltage gain changeover switch is controlled to connect the fourth terminal 6064 of the second resonance unit 606 to the second terminal of the second capacitor unit (that is, C6), that is, Q8 is controlled to be turned off, and Q7 is controlled to be turned on.

When Q5 and Q6 are turned off, Q7 and Q9 are turned on, and the voltage at two terminals of C6 and C5 passes Q7, $C_{52}$, $L_{52}$, and Q9, to form the second resonance circuit of the second resonance unit 606. In this case, $C_{62}$ and $L_{62}$ are in the charging mode. When Q5 and Q6 are turned on, Q7 and Q9 are turned off, and the voltage at two terminals of $C_{62}$ and $L_{62}$ passes Q5, C7, and Q6, to form the first resonance circuit of the second resonance unit 606. In this case, $C_{62}$ and $L_{62}$ are in the discharging mode. $C_{62}$ and $L_{62}$ are charged in the second resonance circuit of the second resonance unit 606 and discharged in the first resonance circuit, and the voltage $V_{C7}$ at the two terminals of C7 is equal to the voltage at two terminals of C6 and C5, that is, formula 21 still holds.

In a possible implementation, the second voltage gain changeover switch is controlled to connect the fourth terminal 6074 of the third resonance unit 607 to the second terminal of the first capacitor unit (that is, C5), that is, Q12 is controlled to be turned on, and Q13 and Q14 are controlled to be turned off. In this case, the following may be obtained according to formula 12, formula 21, formula 25, and formula 26:

$$V_{out1} = 5V_{in1} \qquad \text{Formula 32}$$

That is, when the first input/output terminal 6001 of the DC/DC converter is an output terminal, the second input/output terminal 6002 is an input terminal, the first voltage gain changeover switch connects the fourth terminal 6064 of the second resonance unit 606 to the second terminal of the second capacitor unit (that is, C6), and the second voltage gain changeover switch connects the fourth terminal 6074 of the third resonance unit 607 to the second terminal of the first capacitor unit (that is, C5), the voltage gain of the DC/DC converter is 5.

In another possible implementation, the second voltage gain changeover switch is controlled to connect the fourth terminal 6074 of the third resonance unit 607 to the second terminal of the second capacitor unit (that is, C6), that is, Q13 is controlled to be turned on, and Q12 and Q14 are controlled to be turned off. In this case, the following may be obtained according to formula 12, formula 21, formula 26, and formula 28:

$$V_{out1} = 6V_{in1} \qquad \text{Formula 33}$$

That is, when the first input/output terminal 6001 of the DC/DC converter is an output terminal, the second input/output terminal 6002 is an input terminal, the first voltage gain changeover switch connects the fourth terminal 6064 of the second resonance unit 606 to the second terminal of the second capacitor unit (that is, C6), and the second voltage gain changeover switch connects the fourth terminal 6074 of the third resonance unit 607 to the second terminal of the second capacitor unit (that is, C6), the voltage gain of the DC/DC converter is 6.

In still another possible implementation, the second voltage gain changeover switch is controlled to connect the fourth terminal 6074 of the third resonance unit 607 to the second terminal of the third capacitor unit (that is, C7), that is, Q14 is controlled to be turned on, and Q12 and Q13 are controlled to be turned off. In this case, the following may be obtained according to formula 12, formula 21, formula 26, and formula 30:

$$V_{out1} = 8V_{in1} \qquad \text{Formula 34}$$

That is, when the first input/output terminal 6001 of the DC/DC converter is an output terminal, the second input/output terminal 6002 is an input terminal, the first voltage gain changeover switch connects the fourth terminal 6064 of the second resonance unit 606 to the second terminal of the second capacitor unit (that is, C6), and the second voltage gain changeover switch connects the fourth terminal 6074 of the third resonance unit 607 to the second terminal of the third capacitor unit (that is, C7), the voltage gain of the DC/DC converter is 8.

In conclusion, if the DC/DC converter includes three resonance units, the first input/output terminal 6001 is an output terminal, and the second input/output terminal 6002 is an input terminal, the voltage gain that may be implemented by the DC/DC converter may be 4, 5, 6, and 8.

Figure 7:
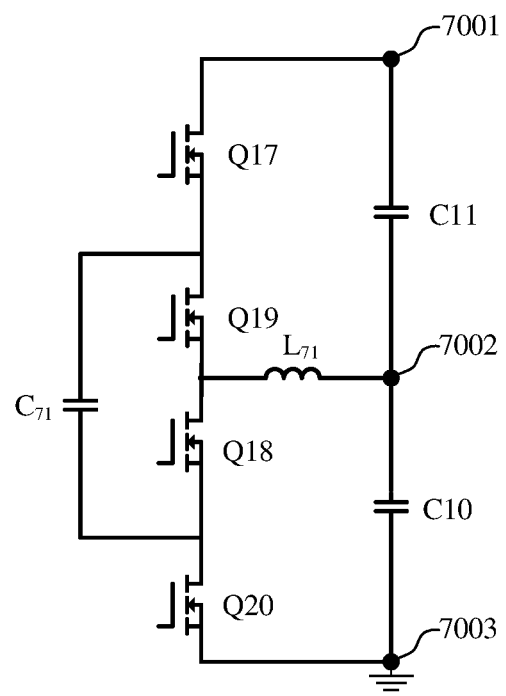
FIG. 7 is a diagram of a circuit of a resonance unit according to an embodiment.

FIG. 7 is a diagram of a circuit of a resonance unit according to an embodiment. The foregoing first resonance unit may have another connection relationship as shown in FIG. 7. FIG. 7 uses an example in which a first capacitor unit included in a DC/DC converter is C10 and a second capacitor unit is C11. The resonance unit includes switching transistors Q17, Q18, Q19, and Q20. The resonance unit further includes, but is not limited to, a capacitor $C_{71}$ and an inductor $L_{71}$. A connection relationship is: Q17 and Q19 are connected, and Q18 and Q20 are connected. A source of Q17 is connected to a drain of Q19, a source of Q18 is connected to a drain of Q20, and a drain of Q18 is connected to the source of Q19. $C_{71}$ is connected between the drain of Q19 and the source of Q18, a first terminal of $L_{71}$ is connected to the drain of Q18 and the source of Q19, and a second terminal (that is, 7002) of $L_{71}$ is connected to a first terminal of C11. In the figure, 7001 is a first input/output terminal of the DC/DC converter, 7002 is a second input/output terminal of the DC/DC converter, and 7003 is a ground terminal of the DC/DC converter. The second terminal of $L_{71}$ is used as a first terminal and a fourth terminal of a first resonance unit, a drain of Q17 is used as a second terminal of the first resonance unit, and a source of Q20 is used as a third terminal of the first resonance unit. C11, $L_{71}$, Q18, $C_{71}$, and Q17 form a first resonance circuit of the first resonance unit, and $C_{71}$, Q20, C10, $L_{71}$, and Q19 form a second resonance circuit of the first resonance unit, so that an effect of the first resonance unit may be achieved. A voltage at two terminals of the first capacitor unit (that is, C10) is equal to a voltage at two terminals of the second capacitor unit (that is, C11). The resonance unit shown in FIG. 7 may be used as any first resonance unit.

The embodiments may further provide a voltage gain switching system. The voltage gain switching system includes a system controller and any DC/DC converter described with reference to FIG. 3 to FIG. 6B. The system controller is connected to the DC/DC converter and configured to turn each switching transistor in the DC/DC converter on or off, generate a voltage gain switching signal, and send the voltage gain switching signal to each voltage gain changeover switch, to implement any possible voltage gain switching of the DC/DC converter. Details are not described herein.

It should be noted that the terms "first" and "second" are only used to describe the purposes, and do not indicate or imply relative importance.

The foregoing descriptions are only implementations, but are not intended to limit the scope of the embodiments. Any variation or replacement readily figured out by a person skilled in the art should fall within the scope of the embodiments.

The invention claimed is:

1. A DC/DC converter comprising:
   a first input/output terminal;
   a second input/output terminal;
   a first capacitor unit, wherein a first terminal of the first capacitor unit is connected to a ground terminal and a second terminal of the first capacitor unit is connected to the second input/output terminal;
   a second capacitor unit, wherein the second terminal of the first capacitor unit is connected to a first terminal of the second capacitor unit;
   a first resonance unit, wherein a first terminal the first resonance unit and a second terminal of the first resonance unit are respectively connected to the first terminal of the second capacitor unit and a second terminal of the second capacitor unit to form a first resonance circuit of the first resonance unit, and a third terminal and a fourth terminal of the first resonance unit are respectively connected to both terminals of the first capacitor unit to form a second resonance circuit of the first resonance unit; and a second resonance unit, wherein a first terminal of the second resonance unit is connected to a second terminal of the second capacitor unit and a second terminal of the second resonance unit is connected to the first input/output terminal to form a first resonance circuit of the second resonance unit, and a third terminal of the second resonance unit is connected to the ground terminal, and a fourth terminal of the second resonance unit is connected to a first voltage gain changeover switch to form a second resonance circuit of the second resonance unit; and the first voltage gain changeover switch is configured to:

connect the fourth terminal of the second resonance unit to the second terminal of the first capacitor unit, or connect the fourth terminal of the second resonance unit to the second terminal of the second capacitor unit.

2. The DC/DC converter according to claim 1, wherein the first voltage gain changeover switch is further configured to connect, based on a received voltage gain switching signal, the fourth terminal of the second resonance unit to the second terminal of the first capacitor unit or the second terminal of the second capacitor unit.

3. The DC/DC converter according to claim 1, wherein the first voltage gain changeover switch further comprises:
a first voltage gain changeover sub-switch; and
a second voltage gain changeover sub-switch, wherein a first terminal of the first voltage gain changeover sub-switch and a first terminal of the second voltage gain changeover sub-switch are connected to the fourth terminal of the second resonance unit, a second terminal of the first voltage gain changeover sub-switch is connected to the second terminal of the first capacitor unit, and a second terminal of the second voltage gain changeover sub-switch is connected to the second terminal of the second capacitor unit.

4. The DC/DC converter according to claim 1, wherein a third capacitor unit is disposed between the first input/output terminal and the second terminal of the second capacitor unit, and the third capacitor unit and the second resonance unit form the first resonance circuit of the second resonance unit.

5. The DC/DC converter according to claim 1, further comprising:
M capacitor units; and
M resonance units, wherein the M capacitor units comprise the first capacitor unit and the second capacitor unit, the M resonance units comprise the first resonance unit and the second resonance unit, and M is an integer not less than 3, wherein
a first terminal of an $(N+1)^{th}$ capacitor unit in the M capacitor units is connected to a second terminal of an $N^{th}$ capacitor unit;
a first terminal of an $N^{th}$ resonance unit in the M resonance units and a second terminal of the $N^{th}$ resonance unit in the M resonance units are respectively connected to the first terminal of the $(N+1)^{th}$ capacitor unit and a second terminal of the $(N+1)^{th}$ capacitor unit to form a first resonance circuit of the $N^{th}$ resonance unit;
a third terminal of the $N^{th}$ resonance unit is connected to the ground terminal, and
a fourth terminal of the $N^{th}$ resonance unit is connected to an $(N-1)^{th}$ voltage gain changeover switch to form a second resonance circuit of the $N^{th}$ resonance unit;
the $(N-1)^{th}$ voltage gain changeover switch is configured to connect the fourth terminal of the $N^{th}$ resonance unit to a second terminal of any capacitor unit from the first capacitor unit to the $N^{th}$ capacitor unit, and N is an integer not less than 2 and not greater than M−1;
a first terminal of an $M^{th}$ capacitor unit in the M capacitor units is connected to a second terminal of an $(M-1)^{th}$ capacitor unit;
a first terminal of an $M^{th}$ resonance unit in the M resonance units is connected to a second terminal of the $M^{th}$ capacitor unit, and
a second terminal of the $M^{th}$ resonance unit is connected to the first input/output terminal to form a first resonance circuit of the $M^{th}$ resonance unit;
a third terminal of the $M^{th}$ resonance unit is connected to the ground terminal,
a fourth terminal of the $M^{th}$ resonance unit is connected to an $(M-1)^{th}$ voltage gain changeover switch, and
the $(M-1)^{th}$ voltage gain changeover switch is configured to connect the fourth terminal of the $M^{th}$ resonance unit to a second terminal of any capacitor unit from the first capacitor unit to the $M^{th}$ capacitor unit.

6. The DC/DC converter according to claim 5, wherein the $(N-1)^{th}$ voltage gain changeover switch is further configured to
connect, based on a received voltage gain switching signal, the fourth terminal of the $N^{th}$ resonance unit to the second terminal of any capacitor unit from the first capacitor unit to the $N^{th}$ capacitor unit; and the $(M-1)^{th}$ voltage gain changeover switch is further configured to
connect, based on the received voltage gain switching signal, the fourth terminal of the $M^{th}$ resonance unit to the second terminal of any capacitor unit from the first capacitor unit to the $M^{th}$ capacitor unit.

7. The DC/DC converter according to claim 5, wherein the $(N-1)^{th}$ voltage gain changeover switch further comprises:
N voltage gain changeover sub-switches that respectively correspond to the first capacitor unit to the $N^{th}$ capacitor unit, a first terminal of each voltage gain changeover sub-switch of the N voltage gain changeover sub-switches is connected to the fourth terminal of the $N^{th}$ resonance unit, and a second terminal of each voltage gain changeover sub-switch is connected to a second terminal of the corresponding capacitor unit; and the $(M-1)^{th}$ voltage gain changeover switch further comprises:
M voltage gain changeover sub-switches that respectively correspond to the M capacitor units, a first terminal of each voltage gain changeover sub-switch of the M voltage gain changeover sub-switches is connected to the fourth terminal of the $M^{th}$ resonance unit, and a second terminal of each voltage gain changeover sub-switch is connected to the second terminal of the corresponding capacitor unit.

8. The DC/DC converter according to claim 5, wherein an $(M+1)^{th}$ capacitor unit is disposed between the first input/output terminal and the second terminal of the $M^{th}$ capacitor unit, and the $(M+1)^{th}$ capacitor unit and the $M^{th}$ resonance unit form the first resonance circuit of the $M^{th}$ resonance unit.

9. The method according to claim 5, wherein,
when the first input/output terminal is an input terminal and the second input/output terminal is an output terminal, a voltage gain is between $1/2^N$ and $1/(N+1)$; and when the first input/output terminal is an output terminal and the second input/output terminal is an input terminal, the voltage gain is between N+1 to $2^N$.

10. The DC/DC converter according to claim 1, wherein, when the first input/output terminal is an input terminal and the second input/output terminal is an output terminal, the first input/output terminal is connected to a direct current power supply, and the second input/output terminal is connected to a load; and when the first input/output terminal is an output terminal and the second input/output terminal is an input terminal, the first input/output terminal is connected to the load, and the second input/output terminal is connected to the direct current power supply.

11. The DC/DC converter according to claim 1, wherein a conduction time of the first resonance circuit is equal to a conduction time of the second resonance circuit.

12. A method of a DC/DC converter, wherein the DC/DC converter comprises:
   a first input/output terminal;
   a second input/output terminal;
   a first capacitor unit, wherein a first terminal of the first capacitor unit is connected to a ground terminal and a second terminal of the first capacitor unit is connected to the second input/output terminal;
   a second capacitor unit, wherein the second terminal of the first capacitor unit is connected to a first terminal of the second capacitor unit;
   a first resonance unit, wherein a first terminal of the first resonance unit and a second terminal of the first resonance unit are respectively connected to the first terminal of the second capacitor unit and a second terminal of the second capacitor unit to form a first resonance circuit of the first resonance unit, and a third terminal and a fourth terminal of the first resonance unit are respectively connected to both terminals of the first capacitor unit to form a second resonance circuit of the first resonance unit; and
   a second resonance unit, wherein a first terminal of the second resonance unit is connected to a second terminal of the second capacitor unit and a second terminal of the second resonance unit is connected to the first input/output terminal to form a first resonance circuit of the second resonance unit, and a third terminal of the second resonance unit is connected to the ground terminal, and a fourth terminal of the second resonance unit is connected to a first voltage gain changeover switch to form a second resonance circuit of the second resonance unit,
   and the method comprises configuring the first voltage gain changeover switch to:
   connect the fourth terminal of the second resonance unit to the second terminal of the first capacitor unit, or
   connect the fourth terminal of the second resonance unit to the second terminal of the second capacitor unit; and
   controlling the first voltage gain changeover switch to:
   connect the fourth terminal of the second resonance unit to the second terminal of the first capacitor unit, or
   connecting the fourth terminal of the second resonance unit to the second terminal of the second capacitor unit.

13. The method according to claim 12, wherein controlling the first voltage gain changeover switch to connect the fourth terminal of the second resonance unit to the second terminal of the first capacitor unit, or connecting the fourth terminal of the second resonance unit to the second terminal of the second capacitor unit further comprises:

sending a voltage gain switching signal to the first voltage gain changeover switch, so that the first voltage gain changeover switch connects, based on the voltage gain switching signal, the fourth terminal of the second resonance unit to the second terminal of the first capacitor unit or the second terminal of the second capacitor unit.

14. The method according to claim 12, wherein the first voltage gain changeover switch further comprises:
   a first voltage gain changeover sub-switch and
   a second voltage gain changeover sub-switch; and controlling the first voltage gain changeover switch to connect the fourth terminal of the second resonance unit to the second terminal of the first capacitor unit, or connecting the fourth terminal of the second resonance unit to the second terminal of the second capacitor unit further comprises:
   controlling the first voltage gain changeover sub-switch to connect the fourth terminal of the second resonance unit to the second terminal of the first capacitor unit; or
   controlling the second voltage gain changeover sub-switch to connect the fourth terminal of the second resonance unit to the second terminal of the second capacitor unit.

15. The method according to claim 12, wherein the DC/DC converter further comprises:
   M capacitor units and
   M resonance units, the M capacitor units comprise the first capacitor unit and the second capacitor unit, the M resonance units comprise the first resonance unit and the second resonance unit, and M is an integer not less than 3, wherein
   a first terminal of an $(N+1)^{th}$ capacitor unit in the M capacitor units is connected to a second terminal of an $N^{th}$ capacitor unit;
   a first terminal of an $N^{th}$ resonance unit in the M resonance units and a second terminal of the $N^{th}$ resonance unit in the M resonance units are respectively connected to the first terminal both terminals of the $(N+1)^{th}$ capacitor unit and a second terminal of the second capacitor unit to form a first resonance circuit of the $N^{th}$ resonance unit;
   a third terminal of the $N^{th}$ resonance unit is connected to the ground terminal, and a fourth terminal of the $N^{th}$ resonance unit is connected to an $(N-1)^{th}$ voltage gain changeover switch to form a second resonance circuit of the $N^{th}$ resonance unit;
   the $(N-1)^{th}$ voltage gain changeover switch is configured to connect the fourth terminal of the $N^{th}$ resonance unit to a second terminal of any capacitor unit from the first capacitor unit to the $N^{th}$ capacitor unit, and N is an integer not less than 2 and not greater than M−1;
   a first terminal of an $M^{th}$ capacitor unit in the M capacitor units is connected to a second terminal of an $(M-1)^{th}$ capacitor unit;
   a first terminal of an $M^{th}$ resonance unit in the M resonance units is connected to a second terminal of the $M^{th}$ capacitor unit, and a second terminal of the $M^{th}$ resonance unit is connected to the first input/output terminal to form a first resonance circuit of the $M^{th}$ resonance unit;
   a third terminal of the $M^{th}$ resonance unit is connected to the ground terminal, a fourth terminal of the $M^{th}$ resonance unit is connected to an $(M-1)^{th}$ voltage gain changeover switch, and the $(M-1)^{th}$ voltage gain changeover switch is configured to connect the fourth terminal of the $M^{th}$ resonance unit to a second terminal of any capacitor unit from the first capacitor unit to the $M^{th}$ capacitor unit; and, controlling the $(N-1)^{th}$ voltage gain changeover switch to connect the fourth terminal of the $N^{th}$ resonance unit to the second terminal of any capacitor unit from the first capacitor unit to the $N^{th}$ capacitor unit; or controlling the $(M-1)^{th}$ voltage gain changeover switch to connect the fourth terminal of the $M^{th}$ resonance unit to the second terminal of any capacitor unit from the first capacitor unit to the $M^{th}$ capacitor unit.

16. The method according to claim 15, wherein controlling the $(N-1)^{th}$ voltage gain changeover switch to connect the fourth terminal of the $N^{th}$ resonance unit to the second terminal of any capacitor unit from the first capacitor unit to the $N^{th}$ capacitor unit further comprises:

sending a voltage gain switching signal to the $(N-1)^{th}$ voltage gain changeover switch, so that the $(N-1)^{th}$ voltage gain changeover switch connects, based on the voltage gain switching signal, the fourth terminal of the $N^{th}$ resonance unit to the second terminal of any capacitor unit from the first capacitor unit to the $N^{th}$ capacitor unit; and controlling the $(M-1)^{th}$ voltage gain changeover switch to connect the fourth terminal of the $M^{th}$ resonance unit to the second terminal of any capacitor unit from the first capacitor unit to the $M^{th}$ capacitor unit further comprises:

sending the voltage gain switching signal to the $(M-1)^{th}$ voltage gain changeover switch, so that the $(M-1)^{th}$ voltage gain changeover switch connects, based on the voltage gain switching signal, the fourth terminal of the $M^{th}$ resonance unit to the second terminal of any capacitor unit from the first capacitor unit to the $M^{th}$ capacitor unit.

17. The method according to claim 15, wherein the $(N-1)^{th}$ voltage gain changeover switch further comprises:

N voltage gain changeover sub-switches that respectively correspond to the first capacitor unit to the $N^{th}$ capacitor unit, and the $(M-1)^{th}$ voltage gain changeover switch further comprises:

M voltage gain changeover sub-switches that respectively correspond to the M capacitor units; and controlling the $(N-1)^{th}$ voltage gain changeover switch to connect the fourth terminal of the $N^{th}$ resonance unit to the second terminal of any capacitor unit from the first capacitor unit to the $N^{th}$ capacitor unit further comprises:

controlling any voltage gain changeover sub-switch in the $(N-1)^{th}$ voltage gain changeover switch to connect the second terminal of the corresponding capacitor unit; and controlling the $(M-1)^{th}$ voltage gain changeover switch to connect the fourth terminal of the $M^{th}$ resonance unit to the second terminal of any capacitor unit from the first capacitor unit to the $M^{th}$ capacitor unit further comprises:

controlling any voltage gain changeover sub-switch in the $(M-1)^{th}$ voltage gain changeover switch to connect the second terminal of the corresponding capacitor unit.

18. A voltage gain switching system comprising:
a system controller; and
a DC/DC converter, wherein the system controller is connected to the DC/DC converter and configured to perform the voltage gain switching, wherein the DC/DC converter comprises:
a first input/output terminal;
a second input/output terminal;
a first capacitor unit, wherein a first terminal of the first capacitor unit is connected to a ground terminal and a second terminal of the first capacitor unit is connected to the second input/output terminal;
a second capacitor unit, wherein the second of the first capacitor unit is connected to a first terminal of the second capacitor unit;
a first resonance unit, wherein a first terminal of the first resonance unit and a second terminal of the first resonance unit are respectively connected to the first terminal of the second capacitor unit and a second terminal of the second capacitor unit to form a first resonance circuit of the first resonance unit, and a third terminal and a fourth terminal of the first resonance unit are respectively connected to both terminals of the first capacitor unit to form a second resonance circuit of the first resonance unit; and
a second resonance unit, wherein a first terminal of the second resonance unit is connected to a second terminal of the second capacitor unit and a second terminal of the second resonance unit is connected to the first input/output terminal to form a first resonance circuit of the second resonance unit, and a third terminal of the second resonance unit is connected to the ground terminal, and a fourth terminal of the second resonance unit is connected to a first voltage gain changeover switch to form a second resonance circuit of the second resonance unit, and
the first voltage gain changeover switch is configured to:
connect the fourth terminal of the second resonance unit to the second terminal of the first capacitor unit, or
connect the fourth terminal of the second resonance unit to the second terminal of the second capacitor unit; and
the system controller is configured to:
control the first voltage gain changeover switch to connect the fourth terminal of the second resonance unit to the second terminal of the first capacitor unit, or
connect the fourth terminal of the second resonance unit to the second terminal of the second capacitor unit.

19. The voltage gain switching system of claim 18, wherein the DC/DC converter comprises M capacitor units and M resonance units, the M capacitor units comprise the first capacitor unit and the second capacitor unit, the M resonance units comprise the first resonance unit and the second resonance unit, and M is an integer not less than 3, wherein a first terminal of an $(N+1)^{th}$ capacitor unit in the M capacitor units is connected to a second terminal of an $N^{th}$ capacitor unit;

a first terminal of an $N^{th}$ resonance unit in the M resonance units and a second terminal of the $N^{th}$ resonance unit an $N^{th}$ resonance unit in the M resonance units are respectively connected to the first terminal both terminals of the $(N+1)^{th}$ capacitor unit and a second terminal of the second capacitor unit to form a first resonance circuit of the $N^{th}$ resonance unit;

a third terminal of the $N^{th}$ resonance unit is connected to the ground terminal, and a fourth terminal of the $N^{th}$ resonance unit is connected to an $(N-1)^{th}$ voltage gain changeover switch to form a second resonance circuit of the $N^{th}$ resonance unit;

the $(N-1)^{th}$ voltage gain changeover switch is configured to connect the fourth terminal of the $N^{th}$ resonance unit to a second terminal of any capacitor unit from the first capacitor unit to the $N^{th}$ capacitor unit, and N is an integer not less than 2 and not greater than M−1;

a first terminal of an $M^{th}$ capacitor unit in the M capacitor units is connected to a second terminal of an $(M-1)^{th}$ capacitor unit;

a first terminal of an $M^{th}$ resonance unit in the M resonance units is connected to a second terminal of the $M^{th}$ capacitor unit, and a second terminal of the $M^{th}$ resonance unit is connected to the first input/output terminal to form a first resonance circuit of the $M^{th}$ resonance unit;

a third terminal of the $M^{th}$ resonance unit is connected to the ground terminal, a fourth terminal of the $M^{th}$ resonance unit is connected to an $(M-1)^{th}$ voltage gain changeover switch, and the $(M-1)^{th}$ voltage gain changeover switch is configured to connect the fourth terminal of the $M^{th}$ resonance unit to a second terminal of any capacitor unit from the first capacitor unit to the $M^{th}$ capacitor unit;

wherein the system controller is configured to:

control the $(N-1)^{th}$ voltage gain changeover switch to connect the fourth terminal of the $N^{th}$ resonance unit to the second terminal of any capacitor unit from the first capacitor unit to the $N^{th}$ capacitor unit, or control the $(M-1)^{th}$ voltage gain changeover switch to connect the fourth terminal of the $M^{th}$ resonance unit to the second terminal of any capacitor unit from the first capacitor unit to the $M^{th}$ capacitor unit.

* * * * *